(12) United States Patent
Takaichi et al.

(10) Patent No.: US 11,322,730 B2
(45) Date of Patent: *May 3, 2022

(54) POSITIVE ELECTRODE FOR NONAQEOUS ELECTROLYTE SECONDARY BATTERY AND A NONAQUEOUS ELECTROLYTE SECONDARY BATTERY

(71) Applicant: Maxell, Ltd., Kyoto (JP)

(72) Inventors: Yuta Takaichi, Ibaraki (JP); Toshiharu Shimooka, Ibaraki (JP); Hiroyoshi Aoki, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,413

(22) Filed: Aug. 28, 2020

(65) Prior Publication Data

US 2020/0395597 A1  Dec. 17, 2020

Related U.S. Application Data

(63) Continuation of application No. 15/299,855, filed on Oct. 21, 2016, now Pat. No. 10,833,313.

(30) Foreign Application Priority Data

Oct. 22, 2015  (JP) .................................. 2015-208433
Sep. 29, 2016  (JP) .................................. 2016-190602

(51) Int. Cl.
*H01M 4/13*   (2010.01)
*H01M 50/46*  (2021.01)
(Continued)

(52) U.S. Cl.
CPC ............ *H01M 4/13* (2013.01); *H01M 50/461* (2021.01); *H01M 10/052* (2013.01); *H01M 10/0587* (2013.01); *H01M 2004/021* (2013.01)

(58) Field of Classification Search
CPC ........... H01M 10/052; H01M 10/0587; H01M 2004/021; H01M 4/13; H01M 50/461; Y02E 60/10; Y02P 70/50
See application file for complete search history.

(56) References Cited

U.S. PATENT DOCUMENTS

2009/0202907 A1   8/2009  Muraoka et al.
2013/0149604 A1*  6/2013  Fujiki .................. H01M 4/525
                                             429/211

(Continued)

FOREIGN PATENT DOCUMENTS

JP   2008-059876 A   3/2008
JP   2009-048876 A   3/2009

(Continued)

OTHER PUBLICATIONS

Akimoto et al. (Journal of Solid State Chemistry, vol. 141, issue 1, Nov. 15, 1998, p. 298-302)(Year:1998).

(Continued)

*Primary Examiner* — Victoria H Lynch
(74) *Attorney, Agent, or Firm* — Westerman, Hattori, Daniels & Adrian, LLP

(57) ABSTRACT

There is provided a positive electrode for nonaqueous electrolyte secondary batteries having a high-density and a high folding strength. There is also provided a nonaqueous electrolyte secondary battery including such a positive electrode. The positive electrode has a high folding strength when it is used in a battery with a high current density, and a nonaqueous electrolyte secondary battery having such a positive electrode. The positive electrode has an electrode body having formed a folded portion at least at one part of the positive electrode. With respect to a cross-section of the positive electrode composition layer, a domain A extends from a central part to a surface side of a thickness direction, (Continued)

and a domain B extends from the central part to the current collector. The distribution of the binder in domain A and domain B are specified.

16 Claims, 2 Drawing Sheets

(51) Int. Cl.
*H01M 4/02* (2006.01)
*H01M 10/0587* (2010.01)
*H01M 10/052* (2010.01)

(56) References Cited

U.S. PATENT DOCUMENTS

| | | |
|---|---|---|
| 2013/0224584 A1 | 8/2013 | Sung et al. |
| 2014/0242470 A1 | 8/2014 | Ogata |
| 2015/0340732 A1 | 11/2015 | Kim et al. |

FOREIGN PATENT DOCUMENTS

| | | |
|---|---|---|
| JP | 2011-129399 A | 6/2011 |
| JP | 2013-222612 A | 10/2013 |
| JP | 2015-072793 A | 4/2015 |
| WO | 2011/148550 A1 | 12/2011 |

OTHER PUBLICATIONS

Non Final Office Action dated Jan. 12, 2018, issued in U.S. Appl. No. 15/299,855.
Final Office Action dated Jul. 16, 2018, issued in U.S. Appl. No. 15/299,855.
Non Final Office Action dated Jan. 18, 2019, issued in U.S. Appl. No. 15/299,855.
Non Final Office Action dated Jul. 29, 2019, issued in U.S. Appl. No. 15/299,855.
Final Office Action dated Feb. 3, 2020, issued in U.S. Appl. No. 15/299,855.

\* cited by examiner

POSITIVE ELECTRODE FOR NONAQEOUS ELECTROLYTE SECONDARY BATTERY AND A NONAQUEOUS ELECTROLYTE SECONDARY BATTERY

CROSS-REFERENCE TO RELATED APPLICATION

The application is a Continuation of U.S. patent application Ser. No. 15/299,855, filed on Oct. 21, 2016, which is based on Japanese priority application No. 2016-190602 filed on Sep. 29, 2016 and No. 2015-208433 filed on Oct. 22, 2015.

TECHNICAL FIELD

The present invention relates to a positive electrode for nonaqueous electrolyte secondary batteries having a high-density and a high folding strength, and a nonaqueous electrolyte secondary battery including such a positive electrode. Also, the present invention relates to a positive electrode for nonaqueous electrolyte secondary batteries having a high folding strength when it is used in a battery with a high current density, and a nonaqueous electrolyte secondary battery having such a positive electrode.

TECHNICAL BACKGROUND

The nonaqueous electrolyte secondary batteries have a high volume energy density and a weight energy density, and therefore, they have been widely used not only in consumer apparatus such as cell-phones and notebook PCs but also in industrial application such as in-vehicle use and robot use. Therefore, the features demanded are diverse, and further improvements in their performance are demanded by various means.

Patent Reference No. 1 proposes the followings. When a positive electrode composition layer has filled with particles of a positive electrode active material at a high density to be wound to form a positive electrode with a high density active material, a stress can be generated to cause the current collector to be broken or the positive electrode to be damaged by making cracks or flaws in on the positive electrode composition layer. In order to restrain it, this reference proposes considering a curve of a correlation between a distance from the current collector in the thickness direction of the positive electrode composition layer and a quantity of the binder. Then, the minimum point of the curve is made located at the central position of the thickness direction of the positive electrode composition layer. Also, this reference proposes providing the quantity of the binder at the side of the current collector of the positive electrode at a higher volume than the quantity of the binder at a portion apart from the current collector.

Patent Reference No. 2 proposes the followings. In order to obtain a high discharge capacity in a cycle at a high-speed charge discharge, a technique is proposed to adjust the concentration of the lithium element, the quantity of conductive assistant, and the binder material at a side of the surface of the positive electrode composition layer and at a side of the current collector.

Patent Reference No. 3 discloses as followings. In order to improve a high input output property and a charge discharge cycle characteristic, this reference proposes a positive electrode by providing two or more layers of positive electrode composition layers, in which the quantity of the conductive assistant at the layer adjacent to the current collector is larger than the quantity of the conductive assistant of the layers other than that layer adjacent to the current collector.

PRIOR ART REFERENCES

Patent References

Patent Reference No. 1: International Patent Publication No. 2011-0148550.
Patent Reference No. 2: Japanese Laid-Open Patent Publication No. 2011-129399
Patent Reference No. 3: Japanese Laid-Open Patent Publication No. 2008-059876

The Objectives to Solve by the Invention

By the way, in order to improve the volume energy density, the folding strength of the positive electrode can be generally decreased if the current density of the battery is set to be 3.85 mA/cm$^2$ or more. Also, when the density of the positive electrode composition layer is made higher e.g. at 3.95 g/cm$^3$ or more, the folding strength of the positive electrode can become low since the filling characteristic of the positive electrode active material in a positive electrode composition layer is very high. Thus, when a nonaqueous electrolyte secondary battery using an electrode body such as a winding electrode body of a positive electrode in which a folded portion is included therein, it becomes likely that the positive electrode is broken at the folded portion at the time of winding the electrode body or at the time of charging and discharging the battery, if a positive electrode composition layer includes a high-density positive electrode, or if the current density of the battery is increased as explained above.

The objective of the present invention is to provide a positive electrode for nonaqueous electrolyte secondary batteries having a high-density and a high folding strength, and a nonaqueous electrolyte secondary battery including such a positive electrode. Also, the objective of the present invention is to provide a positive electrode for nonaqueous electrolyte secondary batteries having a high folding strength when it is used in a battery with a high current density, and a nonaqueous electrolyte secondary battery having such a positive electrode.

SUMMARY OF THE INVENTION

Means to Solve the Objectives

There is provided a positive electrode for a nonaqueous electrolyte secondary battery in which the positive electrode is to be housed inside an exterior body of a nonaqueous electrolyte secondary battery, the nonaqueous electrolyte secondary battery comprising an electrode body comprising a positive electrode, a negative electrode, a separator, a folded portion formed at least at one part of the positive electrode, and a nonaqueous electrolyte. The positive electrode comprising a positive electrode composition layer on one side or both sides of a positive electrode current collector. The positive electrode composition layer comprises at least a positive electrode active material, a binder and a conductive assistant. A density of the positive electrode composition layer is 3.95 g/cm$^3$ or more. A cross-section of the positive electrode composition layer has a domain A extending from a central part to a surface side in a thickness direction thereof, and a domain B extending from the central part to the current collector thereof. The positive electrode has an a/b value of 2 or more, the a/b value being obtained in accordance with the method explained below.

Method to Obtain the a/b Value

It is to carry out a step of detecting elements derived from the binder by means of SEM-EDX with respect to the cross-section of the positive electrode composition layer. SEM-EDX can detect B (boron) to U (uranium). Among the elements detected, it is to carry out a step of selecting a first element included in the binder at the highest quantity among the elements detected, and selecting a second element included in the binder at the second highest quantity among the elements detected. It is further to carry out a step of drawing a first element mapping of the first element, and drawing a second element mapping of the second element. The first element mapping is drawn in a vision field same as the second element mapping. It is to carry out a step of calculating an area where the first element mapping overlaps with the second element mapping. The method is carried out on each the domain A and the domain B. A ratio of the area in the domain A is defined as "a," a ratio of the area in the domain B is defined as "b," thereby obtaining the a/b value.

Also, there is another embodiment of a nonaqueous electrolyte secondary battery. The nonaqueous electrolyte secondary battery comprises an electrode body comprising a positive electrode, a negative electrode, a separator, a folded portion formed at least at one part of the positive electrode, and a nonaqueous electrolyte. The nonaqueous electrolyte secondary battery has a current density of 3.85 mA/cm$^2$ or more. The positive electrode comprises a positive electrode composition layer on one side or both sides of a positive electrode current collector. The positive electrode composition layer comprises at least a positive electrode active material, a binder and a conductive assistant. A cross-section of the positive electrode composition layer has a domain A extending from a central part to a surface side in a thickness direction thereof, and a domain B extending from the central part to the current collector thereof. The positive electrode has an a/b value of 2 or more. The a/b value is obtained in accordance with the method explained above.

Furthermore, there is provided a nonaqueous electrolyte secondary battery comprising an electrode body comprising a positive electrode, a negative electrode, a separator, and a nonaqueous electrolyte. The positive electrode is housed inside an exterior body of a nonaqueous electrolyte secondary battery. The positive electrode comprising a positive electrode composition layer on one side or both sides of a positive electrode current collector, and a folded portion formed at least at one part of the positive electrode. The positive electrode composition layer comprises at least a positive electrode active material, a binder and a conductive assistant. A density of the positive electrode composition layer is 3.95 g/cm$^3$ or more. A cross-section of the positive electrode composition layer has a domain A extending from a central part to a surface side in a thickness direction thereof, and a domain B extending from the central part to the current collector thereof. The positive electrode has an a/b value of 2 or more, the a/b value being obtained in accordance with the method explained below.

In addition, yet another embodiment of the nonaqueous electrolyte secondary battery is provided. The nonaqueous electrolyte secondary battery comprises an electrode body comprising a positive electrode, a negative electrode, a separator, and a nonaqueous electrolyte. The positive electrode is housed inside an exterior body of a nonaqueous electrolyte secondary battery. The nonaqueous electrolyte secondary battery has a current density of 3.85 mA/cm$^2$ or more. The positive electrode comprising a positive electrode composition layer on one side or both sides of a positive electrode current collector, and a folded portion formed at least at one part of the positive electrode. The positive electrode composition layer comprises at least a positive electrode active material, a binder and a conductive assistant. A cross-section of the positive electrode composition layer has a domain A extending from a central part to a surface side in a thickness direction thereof, and a domain B extending from the central part to the current collector thereof. The positive electrode has an a/b value of 2 or more, the a/b value being obtained in accordance with the method explained below.

Effects of the Invention

According to the present invention, there is provided a positive electrode for nonaqueous electrolyte secondary batteries having a high-density and a high folding strength, and a nonaqueous electrolyte secondary battery including such a positive electrode. There is also provided a positive electrode for nonaqueous electrolyte secondary batteries having a high folding strength when it is used in a battery with a high current density, and a nonaqueous electrolyte secondary battery having such a positive electrode.

EMBODIMENTS TO CARRY OUT THE INVENTION

Figure 1:
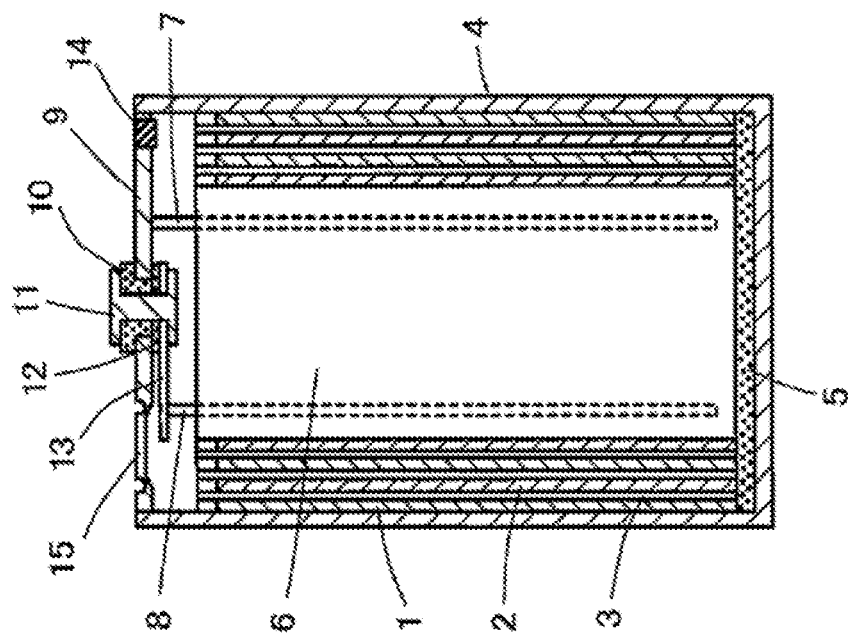
FIG. 1 is a partial cross-sectional view schematically illustrating the nonaqueous electrolyte secondary battery as an example of the embodiment of the present invention.

The positive electrode for nonaqueous electrolyte secondary batteries of the present invention has a folded portion at least at one part thereof when it is made into a battery. For example, the electrode body is a winding electrode body in which the positive electrode, the negative electrode and the separator, each being in a strip shape, are wound into in an eddy form, and a cross-section of the electrode body is made into a flat shape. The electrode body and the nonaqueous electrolyte are housed in an exterior body to be made into a nonaqueous electrolyte secondary battery.

Positive Electrode

The positive electrode for nonaqueous electrolyte secondary batteries of the present invention (which is hereinafter simply referred to "positive electrode") includes a positive electrode composition layer which includes at least a positive electrode active material, a conductive assistant and a binder. The positive electrode composition layer is provided on one side or both sides of a current collector.

The positive electrode, for example, can be prepared as follows. The positive electrode material, a conductive assistant, a binder and etc. are dispersed in a solvent such as N-methyl-2-pyrrolidone (NMP) to prepare a composition containing a positive electrode composition in a paste or slurry state (here, the binder may be dissolved in the solvent), which is then applied on one surface or both surfaces of a current collector, and dried, and then, a calendar process is applied if necessary.

In one embodiment of the nonaqueous electrolyte secondary batteries of the present invention, it has a current density of 3.85 mA/cm² or more. The current density means a value per unit area at the positive electrode at a current value of 1.0 C of the battery.

The followings are the reasons why the folding strength of the positive electrode is decreased when the current density of the battery is high. If the current density of the battery is tried to increase without changing the density of the positive electrode composition layer of the positive electrode, the thickness of the positive electrode composition layer should be increased. This, however, results in decreasing the folding strength, and therefore, the positive electrode itself may be broken when producing an electrode body including a folded portion at the positive electrode (e.g., a winding electrode body having a cross-section being flat-shaped). On the other hand, in order to lower the current density of the battery without changing the density of the positive electrode composition layer of the positive electrode, the thickness of the positive electrode composition layer should be decreased. This may secure the folding strength of the positive electrode in part, but the area of the positive electrode composition layer has to be increased instead. Then, this results in decreasing the volume energy density of the battery, and therefore, this is not preferable.

In other words, if trying to realize a high capacity without reducing the volume energy density of the battery, it will be a natural result of increasing the current density. Also, as a result of the examination by the inventors of the present application, it was found that the current density of the battery is 3.85 mA/cm² or more when the folding strength of the positive electrode falls down in a case where the density of the positive electrode composition layer is adjusted to such an extent that the battery has a high capacity.

In addition, in order to increase the current density of the battery, it can be possible to adjust the quantity of the positive electrode composition (which will be explained later) applied on the positive electrode current collector at the time of preparing the positive electrode.

Also, when the density of the positive electrode composition layer is made into a super high densely of 3.95 g/cm³ or more so that a rigid positive electrode active material is highly filled, the positive electrode composition layer becomes very rigid. Then, at the folded portion of the positive electrode, a load is applied from a portion where the positive electrode composition layer contacts the current collector, and finally the positive electrode itself including the current collector may be broken. Even if breakage does not occur at the time of preparing the winding electrode body, the positive electrode current collector may be broken when charging and discharging the battery because of exceeding its tolerance due to the expansion and the shrinkage of the negative electrode.

Therefore, the inventors have considered various ways to realize a positive electrode to restrict the breakage, even when the battery has a current density of 3.85 mA/cm² or more, or even when the density of the positive electrode composition layer is at a level of a super high densely of 3.95 g/cm³ or more. As a result, they have found the invention by providing a positive electrode composition layer with a high folding strength if the binder of the positive electrode composition layer exists more at the surface side of the positive electrode composition layer rather than the current collector side.

When a large amount of the binders exists at the current collector side of the positive electrode composition layer, that part becomes so rigid that a load to the current collector is increased, and therefore, it becomes more likely that the current collector is broken at the folded portion. Therefore, by centralizing the binder in the surface side of the positive electrode composition layer, the load applied to the current collector can be reduced, thereby preventing the breakage of the current collector.

The analysis below can confirm the positive electrode in which more quantities of the binder exist at the surface side of the positive electrode composition layer rather than at the current collector side. With respect to the cross-section of the positive electrode composition layer, the elements derived from the binder are detected by means of SEM-EDX (i.e., Scanning Electron Microscope/Energy Dispersive Using X-Ray Apparatus). Among the elements detected, two kinds of the most element and the second most element in quantity are selected. An element mapping is drawn for each element of the two kinds in the same field of vision. The portion where each element mapping of the two kinds is overlapping with each other corresponds to the portion where the binder exists. Thus, the area of the overlapping portion is calculated.

With respect to the cross-section of the positive electrode composition layer at one side of the current collector, a domain A extends from the central part to the surface side in the thickness direction, and a domain B extends from the central part to the current collector. An area S is calculated for the portion where each element mapping of two kinds derived from the binder overlaps with each other. In the area S, a ratio of the area in the domain A is defined as "a," and a ratio of the area in the domain B is defined as "b." The positive electrode has an a/b value of 2 or more, thereby allocating the binder of the positive electrode composition layer more at the surface side.

When the positive electrode composition layer of the positive electrode of the present invention is formed on only one side of the current collector, this positive electrode composition layer should satisfy the a/b value of 2 or more. When the positive electrode composition layer is formed on both sides of the current collector, each of these positive electrode composition layers should satisfy the a/b value of 2 or more. In either case, the a/b value is measured at three points, each being apart from a same distance in the positive electrode composition layer. The average thereof should satisfy 2 or more.

When the elements derived from the binder are mapped by means of the SEM-EDX method on the cross-section of the positive electrode composition layer, the existence domains of the binder included in the positive electrode composition layer can be shown, while the elements derived from the other materials are shown at the same time. For example, consider a case where PVDF (i.e., polyvinylidene fluoride) is used as a binder. In this case, element C (carbon) detected in SEM-EDX is included most in the binder, but a mapping of which can show not only the binder but also the existence domains of the conductive assistant. When analyzing the positive electrode after the battery is disassembled, if mapping only the second most element, i.e., F (fluorine), included in the binder, it may be possible to detect a film on the positive electrode formed by the fluorine-containing compound included in the nonaqueous electrolyte. In this way, selection of only one element cannot always grasp the existence domains of the binder accurately. Therefore, among the elements detectable by SEM-EDX, each of the two elements in the binder, i.e., the element most included in the binder and another element second most included in the binder, are each mapped. Thus, the accuracy of the judgment can be improved by identifying the portion where the element maps overlap with each other. In addition, in this case, mapping of the elements derived from the electrolytes such P (phosphorus) or B (boron) can identify the residue from the electrolyte, not from the existence domains of the binder.

Next, the analysis method is explained.

The positive electrode in the electrode body is taken out, and the cross-section at the center in the longitudinal direction of the positive electrode composition layer is the target for analysis. The cross-section of the positive electrode is subject to an ion milling processing to expose the surface. With respect to the sample of the positive electrode as provided, elements derived from the binder are detected by means of SEM-EDX, and two kinds of the elements, i.e., the element most included and another element second most included in the binder are selected. An element mapping is carried out for each of the two elements, and the area (i.e., overlapping area) of the part where the element mappings of the two kinds overlap with each other is calculated. Here, with respect to the total overlapping area of the cross-section of the positive electrode composition layer, a ratio percentage, i.e., a %, is for the overlapping area of the domain A extending from the central part to the surface side in the thickness direction, and a ratio percentage, i.e., b %, is for the overlapping area of the domain B extending from the central part to the current collector side in the thickness direction. When the ratio a/b is 2 or more, the folding strength of the positive electrode can be increased. It is preferable that the ratio a/b is 5 or more, and it is more preferable that the ratio a/b is 10 or more. The ration a/b of the Examples and the Comparative Examples described later were obtained by the method explained here.

The ratio a/b can be adjusted as follow. When forming a coating film by applying a positive electrode composition on a current collector during the process of forming the positive electrode composition layer, the drying step is carried out relatively at a low temperature at least at the beginning stage of the drying, thereby adjusting it within the range as mentioned above. The detailed mechanism has not been yet clarified, but the following merits are considered. That is, the positive electrode active material (which will be described later) is included in the positive electrode composition layer and has relatively a high specific gravity, and therefore, it can go down in the composition layer. In other words, it can transfer to the side of the positive electrode current collector. On the other hand, the binder has relatively a low specific gravity, and therefore, it can move to the surface side in the composition layer during the drying process. In addition, at a low temperature at least at the beginning stage of the drying, the phenomenon can be generated more significantly than drying at a high temperature.

The specification condition of drying depends on the thickness of the positive electrode composition layer, but it can be possible to adopt a set temperature of the dry means at 90 to 115° C. For example, the dry means can include means to heat the coating film by a drying method by using warm air through a dryer or by using a far infrared ray heater. As the dry means, a combination of plural dry methods can be used to heat and dry the coating film.

Also, after the coating film has dried at a low temperature at the beginning of the dry process, then, it is preferable to raise the temperature at relatively a high temperature of 120 to 150° C., thereby improving the productivity of the positive electrode. In this case, plural dry means can be prepared such that the dry means at the beginning stage of the dry process is set at 90 to 115° C., and the dry means for the subsequent dry process is set at relatively a high temperature of 120 to 150° C.

An example of the method for drying is explained in detail. First, a positive electrode composition is prepared, which is applied on one surface of the positive electrode current collector, thereby forming a coating film. Then, it is transferred to a dry furnace to dry one side thereof. At this time, several sets of dry means are prepared. The temperature of the first dry means (e.g., a dryer) located at the most upstream in the dry furnace is set at 90 to 115° C., and the temperature of the subsequent dry means (dryers) is set at 120 to 150° C. Then, the current collector having formed the coating film of the positive electrode composition is transferred into the dry furnace. After drying the one side, a positive electrode composition is applied on the other side of the positive electrode current collector to form a coating film, and the same method is carried out for drying. After finishing the drying of the coating films of the positive electrode composition which are applied on both sides of the positive electrode current collector, a calendar processing is carried out, if necessary. As a result, the ratio a/b can be adjusted to fall within the range of 2 or more. The explanation above regarding the method to adjust the ratio a/b is for the purpose of showing an example only. So long as the positive electrode composition layer has the ratio a/b of 2 of more, the method for the drying is not specifically limited.

<Positive Electrode Active Material>

The positive electrode active material used for the positive electrode mentioned above can use known active material such as lithium-containing transition metal oxide, but which is not particularly limited thereto. For example, specific examples of the lithium-containing transition metal oxide can include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_yNi_zCo_{1-y-z}O_2$, $Li_xMn_2O_4$, and $Li_xMn_{2-y}M_yO_4$. In each of the structural formulae above, M is at least one metallic element selected from the group consisting of Mg, Mn, Fe, Co, Ni, Cu, Zn, Al, Ti, Zr, Ge and Cr, and satisfy $0 \leq x \leq 1.1$, $0 \leq y \leq 1.0$, $1.0 \leq z \leq 2.0$. From the viewpoint of the energy density a layer-shaped compound including lithium and cobalt (general formula $LC_{1-y}M^2_yO_2$, where $M^2$ is the same as M except for excluding Co, and y is the same as explained before) is particularly preferable.

<Binder>

As the binder used for the positive electrode mentioned above, either a thermoplastic resin or a thermosetting resin can be used, if it is chemically stable inside a battery. The example thereof can include one kind or two or more kinds of PVDF, polyethylene, polypropylene, polytetrafluoroethylene (PTFE), polyhexafluoropropylene (PHFP), vinylidene fluoride-hexafluoropropylene copolymer (P(VDF-HFP)), styrene butadiene rubber (SBR), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-tetrafluoroethylene copolymer (P(VDF-TFE)), ethylene-tetrafluoroethylene copolymer (ETFE), polychlorotrifluoroethylene (PCTFE), propylene-tetrafluoroethylene copolymer, vinylidene fluoride-chlorotrifluoroethylene copolymer (P(VDF-CTFE)), ethylene-chlorotrifluoroethylene copolymer (ECTFE) or ethylene-acrylic acid copolymer, ethylene-methacrylic acid copolymer, ethylene-acrylic acid methyl copolymer and ethylene-methyl methacrylate copolymer, and Na ion crosslinkage form of those copolymers.

When mapping the elements derived from the binder after performing the SEM-EDX at the cross-section of the positive electrode as mentioned above, and when selecting two elements, i.e., the element most included and another element second most included in the binder, they are selected appropriately based on the kind of the binder as explained above.

When the binder used is a polymer including fluorine such as PVDF, PTFE and PCTFE, or a copolymer including these polymer, C (carbon) and F (fluorine) should be selected as the two elements.

<Conductive Assistant>

The conductive assistant used for the positive electrode mentioned above should be one which is chemically stable in the battery. The examples thereof can include: graphite such as natural graphite and artificial graphite; carbon black such as acetylene black, ketjen black (brand name), channel black, furnace black, lampblack and thermal black; conductive fiber such as carbon fiber and metal fiber; metallic powder such as aluminium flakes; fluorocarbon; zinc oxide; conductive whisker such as potassium titanate; conductive metal oxide such as titanium oxide; and organic conductive material such as polyphenylene derivatives; and these compounds can be used alone or in combination of two or more. Among these compounds, it is preferable to use graphite having a high conductivity, or carbon black having a superior liquid-absorbing property. Also, the form of the conductive assistant is not necessarily in a primary particle, but can be in aggregates such as second aggregate or in an aggregates such as a chain structure. These aggregates are easy in handling and improves the productivity, as well.

<Current Collector>

The current collector used for the positive electrode mentioned above can be the same as conventionally used in the positive electrode of known nonaqueous electrolyte secondary batteries. For example, it is preferable to use an aluminum foil having a thickness of 8 to 30 µm.

<Positive Electrode Composition Layer>

Regarding the positive electrode composition layer mentioned above, it is preferable that the total quantity of the positive electrode active material is 92 to 99 mass %, the quantity of the conductive assistant is 0.5 to 6 mass %, and the quantity of the binder is 0.5 to 6 mass %. It is favorable that the thickness of the positive electrode composition layer is 40 to 300 µm per one side of the current collector after applying a calendar processing.

The density of the positive electrode composition layer of the positive electrode of the present invention is 3.95 g/cm$^3$ or more. In order to increase the density of the positive electrode composition layer, two or more kinds of positive electrode active material particles, each having different average particle diameter, are generally used. Then, the positive electrode composition layer can become highly dense since smaller particles can be filled between larger particles.

In order to realize a positive electrode composition layer with a high density of 3.95 g/cm$^3$ or more, the factors to be controlled can include: a particle size ratio between the particles of the positive electrode active material having the largest average particle diameter and the particles of the positive electrode active material having the least average particle diameter; each content thereof; and the content ratio of the particles of the positive electrode active material having the largest average particle diameter and the particles of the positive electrode active material having the least average particle diameter in the positive electrode active material.

It is noted that in the specification of the present application, the term "the average particle diameter" of various particles means as follow. A micro track particle size distribution measuring equipment, "HRA9320," made by Nik-kiso Co., Ltd. is used to measure a particle size distribution. Then, integral calculus volume is calculated from the smaller particles thereof. In this case, the term corresponds to the value (d50) median diameter of the 50% diameter of the multiplication fraction of the volume standard.

Also, the density of the composition layer in this specification means the value obtained by the measurement method below. A positive electrode having a predetermined area is cut out, and its weight is measured by using an electronic balance having a minimum scale of 1 mg. This weight is subtracted by the weight of the current collector, thereby producing the weight of the positive electrode composition layer. Also, the total thicknesses of the positive electrode is measured at 10 points by using a micrometer having a smallest scale of 1 µm. The thickness of the current collector is subtracted from each total thickness as measured above, and their results are averaged. By using this average value and the area, the volume of the positive electrode composition layer is calculated. A density of the positive electrode composition layer can be obtained by dividing the weight of the positive electrode composition layer by the volume. The density of the composition layer of the negative electrode can be obtained in the same manner.

In order to make the positive electrode composition layer have a density of 3.95 g/cm$^3$ or more, the following means can be adopted, for example.

<Option 1>

It is preferable that positive electrode active material particles having an average particle diameter of 1-10 µm (i.e., positive electrode active material particles having a smaller average particle diameter) are mixed with positive electrode active material particles having an average particle diameter of 20-30 µm (i.e., positive electrode active material particles having a larger average particle diameter). That is, particles of the positive electrode active materials with two different average particle diameters are preferably mixed. By using large and small particles of the positive electrode active materials, the small particles can fill in the gap made between the large particles, thereby increasing the density of the positive electrode composition layer.

<Option 2>

Two kinds of positive electrode active material particles having two different average particle diameters are combined. Assume that the average particle diameter of the positive electrode active material particle having a small average particle diameter is ds (µm). Assume also that the average particle diameter of the positive electrode active material particle having a large average particle diameter is dl (µm). Then, it is preferable that a ratio dl/ds is 3 to 15. When the average particle diameters of the two kinds of the positive electrode active material particles have the relationship above, the small particles can easily fill in the gap made between the large particles, thereby increasing the density of the positive electrode composition layer.

<Option 3>

Two kinds of positive electrode active material particles having two different average particle diameters are combined. It is preferable that the positive electrode active material particle having a small average particle diameter and the positive electrode active material particle having a large average particle diameter are mixed at a mixture ratio of 40:60 to 60:40. By adopting the mixture ratio above, it is possible to obtain such a quantity ratio that the small particles can just fill in the gap made between the large particles, thereby increasing the density of the positive electrode composition layer.

Several means are described above, but a combination of plural means as explained above can further increase the density of the positive electrode composition layer. It is possible that the density of the positive electrode composition layer can be particularly increased by employing all three means above. In addition, it is preferable that the density of the positive electrode composition layer can be 5.0 g/cm$^3$ or less in view of feasibility.

[Negative Electrode]

The negative electrode used in the nonaqueous electrolyte secondary battery of the present invention can be provided with, for example, a structure having a negative electrode composition layer including a negative electrode active material and a binder, and a conductive assistant if necessary formed on one side of both sides of a current collector.

<Negative Electrode Active Material>

As the negative electrode active material mentioned above, there is no specific limitation, and any material which has been conventionally used in known nonaqueous electrolyte secondary batteries can be used, if it can store and release lithium ions. The examples thereof can include graphite, thermolysis carbon, coke, glassy carbon, burned form of organic high molecular compound, mesocarbon microbeadses (MCMB), and carbon fiber. These compounds are carbon based materials which can store and release lithium ions. These compounds can be used alone or in combination of two kinds or more to form a negative electrode active material. In addition, other examples which can be used as a negative electrode active material can include elements such as silicon (Si), tin (Sn), germanium (Ge), bismuth (Bi), antimonial (Sb) and indium (In), and their alloys; a compound close to lithium metal that can be charged or discharged at a low voltage such as lithium-containing nitride or lithium-containing oxide; and lithium metal or lithium/aluminum alloy. Among them, material represented by SiO$_x$, that includes silicon and oxygen as constituent elements, can be preferably used as a negative electrode active material.

The SiO$_x$ can include microcrystals or an amorphous phase of Si. In this case, the atomic ratio of Si and O is determined with including the microcrystals or the amorphous phase of Si. In other words, the SiO$_x$ can be provided in a structure in which Si (e.g., microcrystalline Si) is dispersed in an amorphous SiO$_2$ matrix, where the atomic ratio x can be determined by including the amorphous SiO$_2$ and the Si dispersed in the amorphous SiO$_2$, satisfying $0.5 \leq x \leq 1.5$. For example, when the material is provided as having a structure in which Si is dispersed in an amorphous SiO$_2$ matrix, and the molar ratio of SiO$_2$ and Si is 1:1, the structural formula of this material can be represented by SiO because x=1 is established. In the case of the material having such a structure, a peak due to the presence of Si (microcrystalline Si) might not be observed, e.g., by X-ray diffraction analysis, but the presence of fine Si can be confirmed by transmission electron microscope observation.

Also, it is favorable that SiO$_x$ as explained above is a complex with a carbon material, and for example, it is desirable that the surface of SiO$_x$ is coated with a carbon material. Usually, SiO$_x$ has a poor conductivity. Therefore, if this is used as a negative electrode active material, in view of securing good battery properties, a conductive material (i.e., conductive assistant) is used, such that the mixing and dispersing of the SiO$_x$ and the conductive material in the negative electrode are made better, thereby forming a superior conductive network. By using such a complex of SiO$_x$ and carbon material, a better conductive network can be formed in the negative electrode rather than using a material obtained by merely mixing SiO$_x$ with carbon material.

<Binder>

As the binder mentioned above, the examples thereof can include starch, polyvinyl alcohol, polyacrylic acid, carboxymethylcellulose (CMC), hydroxypropyl cellulose, regenerated cellulose and polysaccharides such as diacetyl cellulose, and denatured form thereof; thermoplastic resins such as polyvinyl chloride, polyvinylpyrrolidone (PVP), polytetrafluoroethylene, polyvinylidene fluoride, polyethylene, polypropylene, polyamideimide and polyamides, and denatured form thereof; polyimide; and polymers having a rubber elasticity such as ethylene-propylene-diene terpolymer (EPDM), sulfonated EPDM, styrene butadiene rubber (SBR), butadiene rubber, polybutadiene, fluorine polymer and polyethylene oxide and denatured form thereof. These compounds can be used alone or in combination of two or more.

<Conductive Assistant>

The negative electrode composition layer as mentioned above can further include a conductive material as a conductive assistant. Such a conductive material is not particularly limited so long as it does not cause a chemical reaction inside the battery. The examples can include carbon black (e.g., thermal black, furnace black, channel black, ketjen black, acetylene black), carbon fibers, metal powders (e.g., powders of e.g., copper, nickel, aluminum, silver and etc.), metal fibers, polyphenylene derivatives (ones disclosed in Japanese Laid-Open Patent Publication No. S59-20971). These compounds can be used alone or in combination of two or more kinds. Of these examples, it is preferable to use carbon black, and ketjen black and acetylene black are more preferable.

<Current Collector>

As the current collector, the examples there can include a foil, punched metal, mesh or expanded metal, made of copper or nickel. Generally, a copper foil can be used. When this negative electrode current collector is configured to reduce the thickness of the whole negative electrode in order to obtain a battery of a high energy density, it is preferable that the upper limit of the thickness is 30 µm. It is also desirable that the lower limit is 5 µm in view of securing a mechanical strength.

<Manufacturing Method of the Negative Electrode>

The example of a method for manufacturing a negative electrode is explained here. A negative electrode active material and a binder, and a conductive assistant if necessary are dispersed into a solvent such as NMP or water to prepare a paste or slurry form of a composition containing a negative electrode composition, which is then applied to one surface or both surfaces of a current collector. After drying, a calendar process is applied if necessary, so as to prepare a negative electrode. However, the manufacturing method of a negative electrode is not limited thereto, and another method can be adopted to prepare it.

<Negative Electrode Composition Layer>

Regarding the negative electrode composition layer mentioned above, it is preferable that the total quantity of the negative electrode active material is 80 to 99 mass % and the quantity of the binder is 1 to 20 mass %. Also, when conductive material is used as a conductive assistant additionally, the conductive material in the negative electrode composition layer can be added to the extent that the total quantities of the negative electrode active material and the quantity of the binder satisfy the preferable ranges of these contents above. For example, the thickness of the negative electrode composition layer is preferably 40 to 400 µm in consideration of the thickness of the positive electrode composition layer as mentioned before.

<Electrode Body>

The positive electrode of the invention is used in a nonaqueous electrolyte secondary battery including an electrode body comprising a positive electrode, a negative electrode and a separator, and a nonaqueous electrolyte, where is housed inside an exterior body. In addition, the electrode body includes at least one folded portion at the positive electrode. Here, the folded portion refers to a point folded or a point where the curvature there is extremely small (for example, it has a radius of curvature of 2 mm or less). The examples of an electrode body having a positive electrode including such a folded portion are as follows: one example is a winding electrode body (i.e., flat-shaped winding electrode body) in which a positive electrode, a negative electrode and a separator, each being in strip shape, are stacked with each other and wound in an eddy form such that its cross-section is made into a flat shape; and another example is an electrode body in which a positive electrode, a negative electrode and a separator are wound into an eddy form such that it is housed inside a cylindrical exterior having a diameter of 3.5 mm or less.

When the electrode body is provided with an adhesive layer either or both between the positive electrode and the separator, or/and between the negative electrode and the separator, it is easy to give the effects of the present invention. When such an adhesive layer is included, the electrode body is prepared by unifying the separator with the electrode through a process (i.e., press process) to press to have the electrode adhere to the separator. Using a nonaqueous electrolyte secondary battery using the electrode body with the electrode unified with the separator, there can be expected to give an effect that the change in the shape of the electrode body is restrained even if repeating charge and discharge. Particularly in case of the flat-shaped winding electrode body as explained above, it is remarkable to obtain such an effect.

In that case, in order to make a positive electrode composition layer having a very high density of 3.95 g/cm$^3$ or more, the positive electrode must have been applied to a more severe situation when pressing. However, in this way the positive electrode of the present invention can be provided with a high tensile strength to endure such a severe condition.

In order to provide an adhesive layer either or both between the positive electrode and the separator, or/and between the negative electrode and the separator, the exemplified form can be as follows: An adhesive layer is provided on one side of the separator; an adhesive layer is provided on both sides of the separator; an adhesive layer is provided on both sides of the negative electrode; an adhesive layer is provided at the negative electrode side of the separator, and is provided on both sides of the positive electrode; and etc. In particularly, it is preferable that when providing an adhesive layer on both sides of the separator, it becomes easy to produce batteries.

It is preferable to include an adhesive layer including an adhesive resin (C) whose adhesive property can be developed by heating. In case of adhesive layer including an adhesive resin (C), the electrode can be unified with the separator through a process (hot-press) to press the electrode while heating. The lowest temperature to develop the adhesive property of the adhesive resin (C) is required to be lower than the temperature to start the shut-down in the other layers of the separator than the adhesive layer. In particular, it is preferably 60° C. or more, and 120° C. or less. Also, if the other layers of the separator than the adhesive layer include a resin porous layer (I) and a heat resistance porous layer (II) as discussed later, the lowest temperature to develop the adhesive property of the adhesive resin (C) is required to be lower than the melting point of the resin (A), that is, the main components of the resin porous layer (I) (whose details will be discussed later).

By using such an adhesive resin (C), when applying the hot-press to the separator and the positive electrode and/or the negative electrode to be unified, it is possible to restrict the deterioration of the separator.

By the existence of the adhesive resin (C), there can be the following peel strength between the separator and the electrode constituting electrode body (e.g., negative electrode) if carrying out a peel test at 180°. In a condition before hot-press, it is preferably 0.05N/20 mm or less, and particularly preferably 0N/20 mm (a state where no adhesive strength exists). In a condition after applying hot-press at a temperature of 60 to 120° C., it is preferable to show a delayed tack characteristic of 0.2N/20 mm or more.

However, when the peel strength is too strong, the electrode composition layers (i.e., the positive electrode composition layer and the negative electrode composition layer) can be peeled from the current collector of the electrode, and thereby the conductivity might be decreased. Therefore, the peel strength at the peel test at 180° is preferably 10N/20 mm or less in a condition after having applied hot-press at a temperature of 60 to 120° C.

In addition, in this specification, the peel strength at 180° between an electrode and a separator can be the value measured in accordance with method below. Each of a separator and an electrode is cut to have a size of 5 cm in length and 2 cm in width. Thereby obtained cut separator is stacked on the electrode cut. When measuring the peel strength of the condition after hot press, the area of 2 cm×2 cm from one end thereof is subject to hot press to prepare a test sample. With respect to the test sample, the separator and the electrode are opened at the other end where the hot press is not applied, and the separator and the negative electrode are bent to create an angle of 180° therebetween. Then, using a tensile strength test equipment, the test sample is held by the equipment such that the one end of the separator and the other end of the electrode, these ends making the angle of 180°. The test sample is pulled at a speed of 10 mm/min to measure the strength when the hot-pressed domain of the separator and the electrode is peeled therefrom. Also, the peel strength of the test sample in a condition before hot press the separator and the electrode can be measured in the same manner as explained above, except for the following difference. That is, the cut separator is stacked on the electrode cut as explained above, but then, the press is applied without heating to prepare a test sample.

Therefore, it is preferable that the adhesive resin (C) has little adhesive property (i.e., adhesiveness) at room temperature (e.g., 25° C.) and has a delayed tack property such that the minimum temperature to develop the adhesive property is lower than the temperature that the separator shuts down, preferably e.g., 60° C. or more and 120° C. or less. In addition, it is more preferable that the temperature to apply the hot press unify a separator with an electrode is 80° C. or more and 100° C. or less so that the thermal contraction of the separator does not significantly produce. It is also preferable that the minimum temperature where the adhesive property of the adhesive property resin (C) develops is 80° C. or more and 100° C. or less.

The adhesive resin (C) having a delayed tack property can be preferably a resin having characteristics in which it has little fluidity at room temperature but shows a fluidity when heat it to adhere by pressing. Also, the adhesive resin (C) can be one that is solid at room temperature but melts when heating it so as to develop an adhesive property through a chemical reaction.

It is preferable that the adhesive resin (C) has a softening point, that is an index such as melting temperature and glass transition temperature, within a range of 60° C. or more and 120° C. or less. For example, the melting temperature of the adhesive resin (C) can be measured in accordance with the method defined in JIS K 7121, and the glass transition temperature of the adhesive resin (C) can be measured in accordance with the method defined in JIS K 7206.

The specific examples of such an adhesive resin (C) can include low density polyethylene (LDPE), poly-α-olefin (for example, polypropylene (PP) and polybutene-1), polyacrylate, ethylene-vinyl acetate copolymer (EVA), ethylene-methyl acrylate copolymer (EMA), ethylene-ethyl acrylate copolymer (EEA), ethylene-butyl acrylate copolymer (EBA), ethylene-methyl methacrylate copolymer (EMMA), and an ionomer resin.

In addition, the adhesive resin (C) used can be provided with a core shell structure in which the core includes a various kind of resins or a resin having an adhesiveness at room temperature such as SBR, nitrile rubber (NBR), fluorine rubber and ethylene-propylene rubber, and the shell includes a resin whose melting temperature or softening point is in a range of 60° C. or more and 120° C. or less. In this case, the shell used can be of e.g., an acrylic resin or polyurethane. Furthermore, the adhesive resin (C) used can be one package type of polyurethane or epoxy resin, showing an adhesive property in the range of 60° C. or more and 120° C. or less.

The resin used in the adhesive resin (C) can be alone or in combination of two or more kinds.

The commercial products of the adhesive resin (C) having a delayed tack property as explained above can include "MORESCO-MELT EXCEL PEEL" (polyethylene, brand name) made by Matsumura Oil Research Co. Ltd., "AQUA-TEX" (EVA, a brand name) made by Co., Ltd., EVA made by Nippon Unicar Cororation, "HEAT MAGIC" (EVA, a brand name) made by Toyo Ink Co., Ltd., "EVAFLEX-EEA Series" (ethylene-acrylic acid copolymer, brand name) made by Du Pont-Mitsui Polychemical Co., Ltd., "ARONTACK TT-1214" (acrylic ester, brand name) made by Toagosei Co., Ltd., and "HIMILAN" (ethylene type ionomer resin, brand name) made by Du Pont-Mitsui Polychemical Co., Ltd. Corporation.

In addition, when an adhesive layer is formed such that substantially no cavities are formed by the adhesive resin (C), the nonaqueous electrolyte of the battery might be difficult to come into contact with the surface of the electrode including a unified separator. Therefore, on the surfaces existing the adhesive resin (C) of the positive electrode, the negative electrode and the separator, it is preferable that a domain where the adhesive resin (C) exists is formed while forming another domain where it does not. In details, the domain where the adhesive resin (C) exists and the other domain where it does not can be formed in strip form in turn. Or, the adhesive resin (C) can be formed in a discontinuous manner in plural existence domains, e.g., when each domain is in a shape of circle in the plan view. In these cases, the existence domains of the adhesive resin (C) can be located regularly or at random.

On the surfaces existing the adhesive resin (C) of the positive electrode, the negative electrode and the separator, it is preferable to form a domain where the adhesive resin (C) exists while forming another domain where it does not. For example, the area (total area) of the domain where the adhesive resin (C) exists can be adjusted such that the peel strength at 180° after heat press of the separator and the electrode falls within the range as explained before. It can fluctuate depending on the kind of the adhesive resin (C) to be used, but in details, it is preferable that the adhesive resin (C) exists at 10 to 60% of the area of the surface where the adhesive property resin (C) exists.

In addition, on the surface where the adhesive property resin (C) exists, it is preferable to consider the targeted application weight of the adhesive resin (C) in order to obtain favorable adhesion with the electrode as well as to adjust the peel strength at 180° after hot press of the separator and the electrode within the range as explained before. That is, it is preferably 0.05 $g/m^2$ or more and more preferably 0.1 $g/m^2$ or more. However, on the surface where the adhesive property resin (C) exists, if the targeted application weight of the adhesive resin (C) is too much, the thickness of the electrode body might be excessively increased, or the adhesive resin (C) might block the cavities of the separator to interrupt the migration of ions in the battery. Thus, on the surface where the adhesive property resin (C) exists, it is preferable that the targeted application weight of the adhesive resin (C) is 1 $g/m^2$ or less, and more preferably 0.5 $g/m^2$ or less.

[Separator]

In the nonaqueous electrolyte secondary battery using the positive electrode of the present invention, it is possible to use a film-formed separator primarily made of polyolefin such as polyethylene, or a known separator of nonwoven fabric.

In particular, it is preferably to use a separator including a resin porous layer (I) primarily made of a resin (A) having a melting temperature of 100 to 170° C., and a heat resistance porous layer (II) primarily made of fillers (B) having a heat-resistant temperature of 150° C. or more and therefore, the heat resistance porous layer (II) does not melt at a temperature of 150° C. or less. In this way, it is possible to prevent the separator from thermal contraction at a high temperature. The resin porous layer (I) is a layer serving as original separator function to prevent short circuit between the positive electrode and the negative electrode while allowing ions to pass therethrough. The heat resistance porous layer (II) is a layer to play a role to give heat resistance to the separator.

The resin porous layer (I) has a melting temperature of 100° C. or more and 170° C. or less. Namely, the resin porous layer (I) is mainly composed of a resin (A) having a melting temperature of 100° C. or more and 170° C. or less, when it is measured by means of a differential scanning calorimeter (DSC) in accordance with JIS K 7121. By using a separator having the resin porous layer (I) mainly composed of the resin (A), so-called shut-down function can be given such that the pores of the separator are blocked by molten thermoplastic resin when the temperature inside the battery becomes high.

The resin (A) as a main component of the resin porous layer (I) is not particularly limited, but it should have the features below; it has a melting temperature of 100° C. or more and 170° C. or less; it has an electrically insulating property; it is electrochemically stable; and it is stable to the nonaqueous electrolyte and the medium used in the composition for making the heat resistance porous layer (II) as discussed later; and it is a thermoplastic resin. Preferable examples thereof can include polyolefin such as polyethylene (PE), polypropylene (PP) and ethylene-propylene copolymer.

The resin porous layer (I) can include, for example, a polyolefin fine porous membrane conventionally used in nonaqueous electrolyte secondary batteries such as lithium secondary batteries. That is, it can have a structure in which a film or sheet of a polyolefin having mixed with inorganic fillers is subject to uniaxial or biaxial stretching so as to form fine pores. Or, the resin porous layer (I) can be provided with a structure in which a mixture of the resin (A) and another resin is made into a film or sheet, which is then immersed in a solvent that can dissolve only said another resin, thereby forming pores by dissolving said another resin.

In addition, the resin porous layer (I) can include fillers for the purpose of improving the strength. For example, the fillers used here can the same as the examples of the fillers (B) used in the heat resistance porous layer (II) as described later.

In this specification, the phrase "mainly composed of a resin (A)" in the resin porous layer (I) means a condition where the resin (A) is included at 70 volume % or more in the total volume of the components of the resin porous layer (I). The quantity of the resin (A) in the resin porous layer (I) is preferably 80 volume % or more, and more preferably 90 volume % or more in the total volume of the components of the resin porous layer (I).

The heat resistance porous layer (II) is mainly composed of a resin which does not melt at temperature of 150° C. or less, or fillers (B) having a heat-resistant temperature of 150° C. or more.

When the heat resistance porous layer (II) includes a resin having a melting temperature of 150° C. or more, for example, one embodiment can be a structure in which a fine porous membrane made of a resin which does not melt at temperature of 150° C. or less (e.g., fine porous membrane for batteries made of PP as explained before) is laminated on the resin porous layer (I). Another embodiment can be a structure in which a dispersion liquid including particles of resin which does not melt at temperature of 150° C. or less is applied on the porous layer (I) and dried, thereby forming a porous layer (II) on the surface of the porous layer (I).

The examples of the resin which does not melt at a temperature of 150° C. or less can include: PP; fine particles of various crosslinked polymer such as crosslinked polymethyl methacrylate, crosslinked polystyrene, crosslinked polydivinylbenzene, styrene-divinylbenzene copolymer crosslinkage product, polyimide, melamine resin, phenolic resin, and benzoguanamine-formaldehyde condensate; polysulfone; polyethersulfone; polyphenylene sulfide; polytetrafluoroethylene; polyacrylonitrile; aramid; and polyacetal.

When using particles of the resin which does not melt at a temperature of 150° C. or less, Regarding the particle size of the particles, the average particle diameter is preferably, for example, 0.01 µm or more, and more preferably 0.1 µm or more, but it is 10 µm or less, and more preferably 2 µm or less.

When the heat resistance porous layer (II) includes fillers (B) having a heat-resistant temperature of 150° C. or more, there is no particular limitation if the fillers (B) have a heat-resistant temperature of 150° C. or more, are electrochemically stable in the battery and stable to the nonaqueous electrolyte in the battery. Regarding the fillers (B) in the instant specification, the phrase "having a heat-resistant temperature of 150° C. or more" refers to a condition where there is no visible change in the shape, such as deformation, at a temperature of at least 150° C. The heat-resistant temperature of the filler (B) is preferably 200° C. or more, and more preferably 300° C. or more, and yet more preferably 500° C. or more.

It is preferable that the fillers (B) are inorganic fine particle having electrically insulating property. Specifically, the examples thereof can include: inorganic oxide fine particles such as iron oxide, silica ($SiO_2$), alumina ($Al_2O_3$), $TiO_2$ and $BaTiO_3$; inorganic nitride fine particles such as aluminum nitride and silicon nitride; insoluble ionic crystal fine particles such as calcium fluoride, barium fluoride and barium sulfate; covalent crystal fine particles such as silicon and diamond; clay fine particles such as montmorillonite; and etc. Here, the inorganic oxide fine particles can be material derived from mineral resources or material artificially made, including boehmite, zeolite, apatite, kaolin, mullite, spinel, olivine and mica. Also, the inorganic compound constituting the inorganic fine particles can be one having applied a process for element substitution or solid solution, if necessary and it is also possible to apply a surface treatment to the inorganic fine particles. Also, the inorganic fine particles can be a conductive material including conductive oxide such as metal, $SnO_2$ and tin-indium oxide (ITO), and carbonaceous material such as carbon black and graphite, the surfaces of which can be covered with a material having an electrically insulating property (e.g., inorganic oxides), thereby giving an electrically insulating property.

The filler (B) used can be fine organic particles. The specific examples of the fine organic particles can include: fine particles of crosslinked polymer such as polyimide, melamine type resin, phenolic type resin, crosslinked polymethylmethacrylate (crosslinked PMMA), crosslinked polystyrene (crosslinked PS), polydivinylbenzene (PDVB), and benzoguanamine-formaldehyde condensate; fine particles of heat resistance polymer such as thermoplastic polyimide; and etc. The organic resin (polymer) constituting the fine organic particles can be a mixture, denatured form, derivative, copolymer (random copolymer, alternating copolymer, block copolymer, graft copolymer) or crosslinked form (in the case of the heat resistance polymer explained before) of the material exemplified above.

The fillers (B) used can be of one kind, or two kinds or more in combination, of the material exemplified above. Among the fillers exemplified above, it is preferable to use inorganic oxide fine particles. In particular, it is preferable to use at least one kind selected from the group consisting of alumina, silica and boehmite.

The average particle diameter of the fillers (B) is preferably 0.001 µm or more, and more preferably 0.1 µm or more, and is preferably 15 µm or less, and more preferably 1 µm or less.

The shape of the filler (B) can be, for example, a shape near a spherical shape, or a plate-shape. In view of the short circuit prevention, it is preferable to be a plate-shape. The representative example of such a plate-shaped particles can include plate-shaped $Al_2O_3$ or plate-shaped boehmite.

In addition, when the nonaqueous electrolyte secondary battery using the resin porous layer (I) and the heat resistance porous layer (II) is required to show a high output performance, it is preferable to use fillers (B) having a secondary particle structure in which a primary particle aggregates. By using tuft-formed fillers, the cavities of the heat resistance porous layer (II) can be enlarged, thereby producing a battery with a high output performance.

In this specification, the phrase "mainly composed of" with respect to the heat resistance porous layer (II) means a condition where one is included at 70 volume % or more in the total volume of the components of the resin porous layer (II). The quantity of the fillers (B) in the heat resistance porous layer (II) is preferably 80 volume % or more, and more preferably 90 volume % or more in the total volume of the components of the heat resistance porous layer (II). When the fillers (B) are included in the heat resistance porous layer (II) at a high content as explained above, thermal contraction of the separator as a whole can be favorably controlled, thereby giving high heat resistance.

In addition, it is preferable that the heat resistance porous layer (II) includes an organic binder in order to adhere to the fillers (B) each other, or between the heat resistance porous layer (II) and the resin porous layer (I). From the view point above, the upper limit of the quantity of the fillers (B) in the heat resistance porous layer (II) is suitably 99 volume % in total volume of the components of the heat resistance porous layer (II). Also, when the quantity of the fillers (B) in the heat resistance porous layer (II) is less than 70 volume %, for example, it is necessary to increase the quantity of the organic binder of in the heat resistance porous layer (II). In that case, the pores of the heat resistance porous layer (II) can be filled with the organic binder, and therefore, the function of the separator might be loss.

The organic binder used for the heat resistance porous layer (II) is not particularly limited, if it can favorably adhere to fillers (B) each other as well as between the heat resistance porous layer (II) and the resin porous layer (I), and if it is electrochemically stable, and if it is stable to the nonaqueous electrolyte liquid for the electrochemical elements. The examples thereof can include fluoric resin [e.g., polyvinylidene fluoride (PVDF)], fluorine type rubber, SBR, carboxymethylcellulose (CMC), hydroxyethyl cellulose (HEC), polyvinyl alcohol (PVA), polyvinyl butyral (PVB), polyvinylpyrrolidone (PVP), poly-N-vinyl acetamide, cross-linked acrylic resin, polyurethane and epoxy resin. The organic binder used can be one kind, or two or more kinds in combination.

In addition, when using the organic binder, it can be used in an embodiment in which the organic binder is dissolved in a medium of the composition (e.g., slurry) for making the heat resistance porous layer (II), or dispersed as an emulsion state, as described later.

The cavity rate of the heat resistance porous layer (II) can be considered as follow. In order to secure the retention quantity of the nonaqueous electrolyte of the nonaqueous electrolyte secondary battery and favorably accomplish ion permeability, the cavity rate is preferably 40% or more, and more favorably 50% or more, at a dry condition. On the other hand, from the viewpoint to secure the strength and prevent the internal short circuit, it is preferable that the cavity rate of the heat resistance porous layer (II) is 80% or less, and more preferably 70% or less.

The separator can include one layer of the resin porous layer (I) and one layer of the heat resistance porous layer (II), or plurality layers of them. In details, only one surface of the resin porous layer (I) can be provided with the heat resistance porous layer (II) to form a separator. Or, both surfaces of the resin porous layer (I) can be provided with the porous layer (II) to form a separator. However, if the number of the layers to constitute the separator is increased, the thickness of the separator will increase, and therefore, the internal resistance of the electrochemical element might increase or the energy density might fall to bring about unfavorable results. Thus, the number of the layers in the separator is preferably five layers or less.

The example of the method for preparing the separator of the present invention is explained. For example, a composition for forming a heat-resistant porous layer (II) including fillers (B) (e.g., a liquid composition such as slurry) is applied on a resin porous layer (I), and dry it at a predetermined temperature. Then, a solution or emulsion including an adhesive resin (C) is applied thereon, and dried it at a predetermined temperature. Thereby, such an adhesive resin (C) can be formed on a separator including the resin porous layer (I) and the heat resistance porous layer (II).

In addition to the filler (B), the heat-resistant composition for forming the porous layer (II) includes an organic binder and etc., which are dispersed in a solvent (which can be a disperse medium, and the same notion is applied hereinafter.). It is noted that the organic binder can be dissolved in a solvent. The solvent used for a composition for forming the heat-resistant porous layer (II) is not particularly limited, if it can disperse fillers (B) and etc. uniformly therein and can dissolve or disperse an organic binder uniformly. The examples thereof can be general organic solvents including aromatic hydrocarbons such as toluene, furans such as tetrahydrofuran, the ketones such as methyl ethyl ketone and methyl isobutyl ketone. It is noted that for the purpose of controlling the surface tension, the solvent can include an additive such as alcohol (e.g., ethylene glycol, propylene glycol), and various propylene oxide type glycol ether such as or monomethyl acetate. When the organic binder is water-soluble, water can be used as a solvent to form an emulsion, but in this case, an alcohol (methyl alcohol, ethyl alcohol, isopropyl alcohol, ethylene glycol) can be appropriately added to control surface tension.

It is preferable that the composition for forming the heat resistant porous layer (II) includes 10 to 80 mass % of a solid content including the filler (B) and the organic binder.

A stacked product of the resin porous layer (I) and the heat-resistant porous layer (II) can be obtained as explained above, onto which a solution or emulsion including the adhesive property resin (C) is applied to form an adhesive layer, thereby producing a separator. It is noted that in this case, the heat-resistant porous layer (II) can be formed on one surface or both surfaces of the resin porous layer (I), and that the adhesive property resin (C) can be provided on one surface or both surfaces of the stacked product of the resin porous layer (I) and the heat-resistant porous layer (II).

In particular, it is preferable that the first adhesive layer, the resin porous layer (I), the heat-resistant porous layer (II) and the second adhesive layer are stacked in this order. In this configuration, the adhesive layer is located at the both sides of the negative electrode and the positive electrode, so that an electrode body, especially a flat-shaped winding electrode body, can further restrain the change in shape due to the charge and discharge, thereby maintaining the original thickness.

Also, in order to more effectively give the effects from the constituting components such as fillers (B), it is possible to adopt an embodiment in which the constituting components are located at an uneven distribution such that the constituting components gather in a domain of layer parallel or almost parallel to the film surface of the separator.

However, the method to prepare a separator is not limited thereto, and it can be prepared in accordance with another method. For example, the composition for forming the heat resistant porous layer (II) as explained above can be applied on a surface of a substrate such as a liner, followed by drying to form a heat-resistant porous layer (II), which is then removed from the substrate. Then, the heat-resistant porous layers (II) is laminated on a fine porous film to become a resin porous layer (I), and a heat press is applied to unify them, thereby obtaining a stacked product. Then, an adhesive resin (C) is formed on one surface or both surfaces of the stacked product in the same manner as explained before, so as to obtain a separator.

The thickness of the separator produced in this way is preferably 6 μm or more, and more preferably 10 μm or more, in view of surely separating the positive electrode from the negative electrode. On the other hand, when the separator becomes too thick, the energy density of the battery might decrease. Therefore, it is preferable that the thickness is 50 μm or less, and more preferably 30 μm or less.

Furthermore, the thickness of the resin porous layer (I) (Note that if a plural layers of the resin porous layer (I) exist, it should be a total thickness.) is preferably 5 μm or more, but preferably 30 μm or less. Also, the thickness of the heat-resistant porous layer (II) (Note that if a plural layers of the heat-resistant porous layer (II) exist, it should be a total thickness.) is preferably 1 μm or more, and more preferably 2 μm or more, and yet more preferably 4 μm or more, but preferably 20 μm or less, and more preferably 10 μm or less, and yet more preferably 6 μm or less. When the resin porous layer (I) is too thin, the shut-down performance might become weak. When it is too thick, the energy density of the battery might decrease, and in addition, the power to bring about thermal contraction might increase too much so large that the effects to control the thermal contraction of the separator as a whole become insufficient. Also, when the heat-resistant porous layer (II) is too thin, the effects to control the thermal contraction of the separator as a whole might become insufficient. However, when it is too thick, the thickness of the separator as a whole might increase.

The cavity rate of the separator as a whole can be considered as follow. In order to secure the retention quantity of the nonaqueous electrolyte liquid of the nonaqueous electrolyte secondary battery and favorably accomplish ion permeability, the cavity rate is preferably 30% or more at a dry condition. On the other hand, from the viewpoint to secure the strength of the separator and prevent the internal short circuit, the cavity rate of the separator is preferably 70% or less at a dry condition.

The separator desirably has a Gurley value of 30 to 300 sec. The Gurley value is obtained by a method according to JIS P 8117 and expressed as the duration of the second it takes for 100 ml air to pass through a membrane at a pressure of 0.879 $g/mm^2$. If the air permeability is too large, the ion permeability may deteriorate. On the other hand, if the air permeability is too small, the strength of the separator may decline.

A nonaqueous electrolyte secondary battery using the positive electrode of the present invention can be prepared by using the electrode below. The positive electrode and the negative electrode as explained before are stacked with each other with intervention of a separator, which are then wounded in eddy form, and pressed to be shaped into the cross-section flat. Then, a heat press process is applied to obtain a flat-shaped winding electrode body. Then, the electrode, e.g., the flat-shaped winding electrode body as explained above, is housed inside an exterior body along with a nonaqueous electrolyte. As a result, a nonaqueous electrolyte secondary battery of the present invention can be obtained.

[Nonaqueous Electrolyte]

The nonaqueous electrolyte used can be a solution (i.e., nonaqueous electrolyte liquid) which has been prepared by dissolving a lithium salt in the following nonaqueous solvent.

The examples of the solvent can include aprotic organic solvents such as ethylene carbonate (EC), propylene carbonate (PC), butylene carbonate (BC), dimethyl carbonate (DMC), diethyl carbonate (DEC), methylethyl carbonate (MEC), γ-butyrolactone (γ-BL), 1,2-dimethoxyethane (DME), tetrahydrofuran (THF), 2-methyltetrahydrofuran, dimethyl sulfoxide (DMSO), 1,3-dioxolane, formamide, dimethylformamide (DMF), dioxolane, acetonitrile, nitromethane, methyl formate, methyl acetate, phosphate triester, trimethoxy methane, dioxolane derivative, sulfolane, 3-methyl-2-oxazolidinone, propylene carbonate derivative, tetrahydrofuran derivative, diethyl ether, and 1,3-propane sultone. The compound used can be one kind, or a mixture of two or more kinds.

The examples of the lithium salt contained in the non-aqueous electrolyte liquid can include lithium salts such as $LiCO_4$, $LPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$) and $LiN(RfOSO_2)_2$ (where Rf represents a fluoroalkyl group). The concentration of the lithium salt in the non-aqueous electrolytic solution is preferably 0.6 to 1.8 mol/L, and more preferably 0.9 to 1.6 mol/L.

In addition, the nonaqueous electrolyte used in the nonaqueous electrolyte secondary battery can further contain additives in view of further improvement of the charge discharge cycle characteristics or for the purpose to improve the safety features such as high temperature storage property and overcharge prevention property. The examples of the additives that can be appropriately added can include vinylene carbonate, vinylethylene carbonate, anhydrous acid, sulfonate, dinitrile, 1,3-propanesultone, diphenyl disulfide, cyclohexylbenzene, biphenyl, fluorobenzene, t-butylbenzene (including the derivatives thereof).

Furthermore, the nonaqueous electrolyte liquid used in the nonaqueous electrolyte secondary battery can further include a gelatification agent conventionally known, such as a polymer, thereby making the nonaqueous electrolyte liquid in a gel state (i.e., gelled electrolyte).

[Nonaqueous Electrolyte Secondary Battery]

The embodiment of the nonaqueous electrolyte secondary battery of the present invention is not particularly limited. For example, it can be provided in any form including a small size embodiment such as cylindrical form, coin form, button form, flat form and rectangular form, and a large size embodiment for e.g., electric vehicles.

In addition, after assembled into an embodiment of the nonaqueous electrolyte secondary battery an activation process is generally applied to making it into a condition for shipment. The activation process mainly includes initial charge process or aging process. Through the activation process, there is a tendency that the densities of the positive electrode composition layer and the negative electrode composition layer are decreased by absorption of the nonaqueous electrolyte or migration of Li ions. Generally, the density of the positive electrode composition layer is decreased by 3 to 10% approximately, and the density of the negative electrode composition layer is decreased by 10 to 20% approximately.

In Example 1 as discussed later, for example, the density of the positive electrode composition layer was 3.95 $g/cm^3$ at the time when the electrode was prepared. However, a battery assembled was applied to ten cycles of charge and discharge and the electrode was taken out, and then, the density of the positive electrode composition layer was measured. At that time, the density was by 3.77 g/cm³, finding a decrease compared with the density when the electrode was prepared.

Also, in Example 1 discussed later, the positive electrode taken out after applying ten cycles of charge and discharge had a capacity density of the positive electrode composition layer per unit volume (i.e., energy density of the positive electrode composition layer) of 2.71 Wh/cm³.

In summary, the density of the positive electrode composition layer at the time when the electrode was prepared was 3.95 g/cm³. The density of the positive electrode composition layer in the battery after 10 cycles of charge and discharge was 3.7 g/cm³. The energy density of the positive electrode composition layer was 2.7 Wh/cm³ or more.

The nonaqueous electrolyte secondary battery of the present invention can be used by setting the charge stop voltage at around 4.2V in the same manner as conventional nonaqueous electrolyte secondary batteries. However, it can be used in a charge method by setting the charge stop voltage at a level more than the above, that is, 4.3V or more. Even if it is charged by the method above to be exposed at a high temperature, good charge discharge cycle characteristic and storage properties can be maintained. However, it is preferable that the charge stop voltage in charging the nonaqueous electrolyte secondary battery is 4.6V or less.

The nonaqueous electrolyte secondary battery of the present invention can be used as the same applications as those of conventionally known nonaqueous electrolyte secondary batteries. According to the present invention, since the density of the positive electrode composition layer is high, the properties of high capacity and energy density per volume can be improved. Therefore, significant effects can be given in apparatus which requires a high capacity in a limited volume, such as mobile device, small size apparatus, and robot application in which many batteries are assembled in series.

EXAMPLES

Hereinafter, the present invention is described in more detail based on the examples. It is, however, noted that the following examples should not be used to narrowly construe the scope of the present invention.

Example 1

<Preparation of Positive Electrode>

LiCoO₂ particles having an average particle diameter of 5 μm and LiCoO₂ particles having an average particle diameter of 27 μm were mixed at a ratio (mass ratio) at 15:85 to obtain a positive electrode active material for preparing a positive electrode. 96 parts by mass of the positive electrode material above, 20 parts by mass of an NMP solution containing PVDF as a binder at a concentration of 10 mass %, and 1 part by mass of artificial graphite and 1 part by mass of ketjen black as conductive assistants were kneaded with a twin screw extruder, into which an NMP was further added to adjust a viscosity, so as to prepare a positive electrode composition containing paste.

The positive electrode composition containing paste above was applied on one surface of an aluminum foil (i.e., positive electrode current collector) having a thickness of 12 μm at an application quantity of 27.7 mg/cm². A dry furnace having two dryers was used, one dryer at the upstream side being set at 115° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 3.96 g/cm³ and a thickness of 70 μm in each surface.

<Preparation of Negative Electrode>

97.5 parts by mass of a negative electrode active material, i.e., a mixture of MCMB (average particle diameter 20 μm) and natural graphite (average particle diameter 20 μm) at a mass ratio of 6:4; 1.5 parts by mass of SBR as a binder; and 1 part by mass of CMC as a thickening agent were added into water for mixing, so as to prepare a negative electrode composition containing paste.

The negative electrode composition containing paste was applied on both surfaces of a copper foil (i.e., a negative electrode current collector) having a thickness of 8 μm, and then, dried at 120° C. for 12 hours in vacuum to obtain a negative electrode composition layer having formed on both surfaces of the copper foil (note that it has formed partly on one surface thereof). Then, a calendar process was applied so that the thickness and the density of the negative electrode composition layer were controlled. Then, a negative electrode current collector tab made of nickel was welded on the exposed part of the copper foil, thereby obtaining a negative electrode having a belt-shape with a length of 990 mm and a width of 55 mm. The negative electrode composition layer of the negative electrode obtained above had a density of 1.65 g/cm³ and a thickness of 86 μm in each surface.

<Preparation of Nonaqueous Electrolyte Liquid>

Into a mixture solvent of ethylene carbonate and diethyl carbonate at a volume ratio of 3:7, LiPF₆ was dissolved at a concentration of 1.1 mol/L, and then, 2 mass % of vinylene carbonate and 2 mass % of fluoroethylene carbonate were added therein to prepare a nonaqueous electrolyte.

<Preparation of Separator>

Into 5 kg of boehmite having an average particle diameter d50 of 1 μm, 5 kg of ion exchanged water and 0.5 kg of dispersant (i.e., aqueous type ammonium polycarboxylate having a solid content concentration of 40 mass %) were added. Then, a milling process was carried out in a ball mill having an internal volume of 20 L at a rotation rate of 40 times/min for 10 hours, thereby obtaining a dispersion liquid. The dispersion liquid obtained after the process above was dried in vacuum at 120° C. An observation by SEM confirmed that the shape of the boehmite was approximately plate-shaped.

Into 500 g of the dispersion liquid above, 0.5 g of xanthan gum as a thickening agent, and 17 g of a resin binder dispersion as a binder (i.e., denatured polybutyl acrylate having a solid content of 45 mass %) were added, which were then stirred with a three-one motor for three hours to obtain a homogeneous slurry [i.e., a slurry for preparing a heat-resistant porous layer (II) having a solid content ratio of 50 mass %].

Onto one surface of a PE fine porous separator for nonaqueous electrolyte secondary batteries [i.e., a resin porous layer (I) having a thickness of 18 μm, a cavity rate of 40% and an average pore diameter of 0.08 μm, in which the melting temperature of PE is 135° C.], a corona discharge process (at an electric discharge amount of 40 W min/m$^2$) was applied. Onto the processed surface above, the slurry for preparing the heat-resistant porous layer (II) was applied by means of a micro gravure coater, and dried, so as to form a heat-resistant porous layer (II) having a thickness of 4 μm. As a result, a laminate type separator was obtained. The mass per unit area of the heat-resistant porous layer (II) of this separator was 5.5 g/m$^2$, and the volume content of the boehmite was 95 volume %, and the cavity rate was 45%.

<Assembling of Battery>

The positive electrode having the belt-shaped and the negative electrode having the belt-shaped, as explained before, were stacked with intervention of the laminate type separator also discussed above such that the heat-resistant porous layer (II) is located at the side of the positive electrode, which was then wound in eddy form. Then, the cross-section thereof was pressed to make it flattened to obtain a flat-shaped winding electrode body. This winding electrode body was fixed with an insulating tape made of polypropylene. Then, the winding electrode body was inserted into a battery case having a prism shape made of aluminum alloy. A lead part was welded thereto, and a lid plate made of aluminum alloy was welded to the opening end of the battery case. Then, a nonaqueous electrolyte liquid was injected from the injection hole provided on the lid plate, and kept still for one hour. Then, the injection hole was sealed. As a result, there was obtained a nonaqueous electrolyte secondary battery having a structure shown in FIG. 1 with an appearance shown in FIG. 2.

The nonaqueous electrolyte secondary battery is then explained with reference to FIG. 1 and FIG. 2. FIG. 1 is a partial cross-sectional view thereof. The positive electrode 1 and the negative electrode 2 were wound into an eddy form with intervention of the separator 3, followed by being pressed into a flat shape to form a flat-shaped winding electrode body 6, and then, housed inside the battery case 4 having a prism shape (i.e., prism barrel shape) along with a nonaqueous electrolyte liquid. However, to avoid complicatedness, FIG. 1 does not illustrate the metal foil as a current collector used in preparation of the positive electrode 1 and the negative electrode 2 as well as the nonaqueous electrolyte liquid.

The battery case 4 is made of aluminum alloy, constituting the exterior body of the battery. This exterior can 4 serves as a positive terminal. Also, an insulator 5 made of a PE sheet is placed on the bottom of battery case 4. The positive electrode 1, the negative electrode 2 and the separator 3 constitute the flat-shaped winding electrode body 6, from which a positive electrode lead body 7 and a negative electrode lead body 8 are drawn, each end thereof being connected to the positive electrode 1 and the negative electrode 2. In addition, the lid plate 9 for sealing made of aluminum alloy is intended to close the opening of the battery case 4. The lid plate 9 is attached to the terminal 11 made of stainless steel via a packing 10 made of PP. To the terminal 11, a lead board 13 made of stainless steel is attached via an insulator 12.

Also, the lid plate 9 was inserted in the opening of the battery case 4, and the joint part has been welded to each other, thereby closing the opening of the battery case 4, and therefore, the battery inside was sealed. In addition, in case of the battery shown in FIG. 1, an injection hole 14 for the nonaqueous electrolyte liquid is provided at the lid plate 9. This injection hole 14 for the nonaqueous electrolyte liquid is inserted with a sealing material, and then, sealed by welding by means of, for example, laser welding. As a result, the battery is secured to be sealed. Furthermore, in order to provide a mechanism to exhaust internal gases to the outside when the temperature of the battery is raised, the lid plate 9 is provided with a cleavage vent 15.

In the battery of Example 1, the positive electrode lead body 7 has been directly welded to the lid plate 9 so that the battery case 4 and the lid plate 9 function as a positive terminal. Also, the negative electrode lead body 8 has been welded to the lead board 13, so that the negative electrode lead body 8 is electrically connected to the terminal 11 via the lead board 13 such that the terminal 11 function as a negative electrode terminal. However, depending on the material of battery case 4, the positive or negative can be reversely provided.

Figure 2:
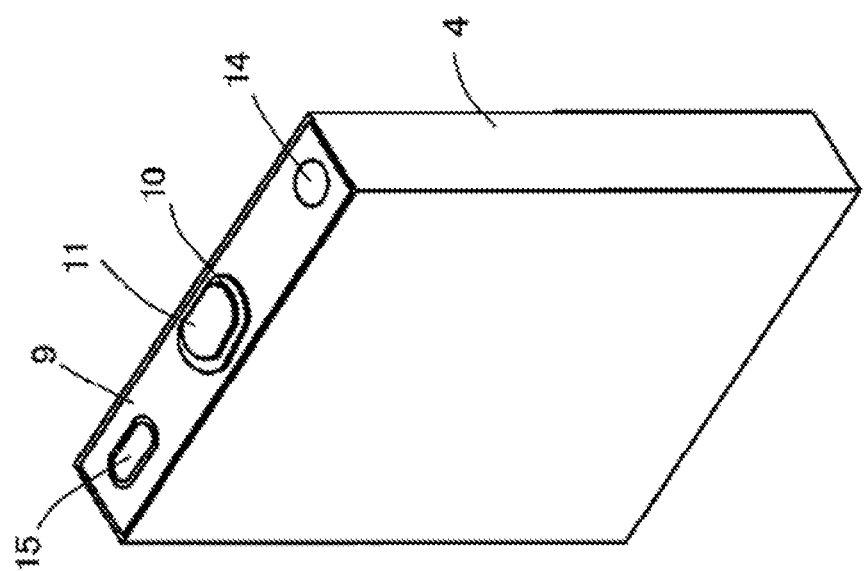
FIG. 2 is a perspective view of FIG. 1.

FIG. 2 is a perspective view schematically showing the appearance of the battery of FIG. 1. FIG. 2 is illustrated for the purpose to show that the battery was a prism shape battery. It is noted that the battery in FIG. 1 is illustrated schematically, and several selective components of the constitution components of the battery are illustrated. It is also noted in FIG. 1 that the inner part of the winding electrode body does show its cross-sectional view. Also, the layers of the separator are not distinguishably illustrated.

Example 2

There was provided the positive electrode composition containing paste prepared in the same manner as Example 1, which was then was applied on one surface of an aluminum foil (i.e., positive electrode current collector) having a thickness of 12 μm at an application quantity of 27.7 mg/cm$^2$. A dry furnace having two dryers was used, one dryer at the upstream side being set at 115° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.02 g/cm$^3$ and a thickness of 69 μm in each surface.

Except for using the positive electrode explained here, the same procedure as Example 1 was carried out to prepare a nonaqueous electrolyte secondary battery.

Example 3

There was provided the positive electrode composition containing paste prepared in the same manner as Example 1, which was then applied on one surface of an aluminum foil (i.e., positive electrode current collector) having a thickness of 12 μm at an application quantity of 27.5 mg/cm$^2$. A dry furnace having two dryers was used, one dryer at the upstream side being set at 115° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil of the positive electrode, thereby obtaining a positive electrode having a belt-shape with a length of 1,000 mm and a width of 54 mm. The positive electrode composition layer of the positive electrode obtained above had a density of 4.11 g/cm$^3$ and a thickness of 67 μm in each surface.

Except for using the positive electrode explained here, the same procedure as Example 1 was carried out to prepare a nonaqueous electrolyte secondary battery.

Example 4

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 100° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 3.96 g/cm$^3$ and a thickness of 70 μm in each surface.

Except for using the positive electrode explained here, the same procedure as Example 1 was carried out to prepare a nonaqueous electrolyte secondary battery.

Example 5

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 100° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.02 g/cm$^3$ and a thickness of 69 μm in each surface.

Except for using the positive electrode explained here, the same procedure as Example 1 was carried out to prepare a nonaqueous electrolyte secondary battery.

Example 6

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 100° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.11 g/cm$^3$ and a thickness of 67 μm in each surface.

Except for using the positive electrode explained here, the same procedure as Example 1 was carried out to prepare a nonaqueous electrolyte secondary battery.

Example 7

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 90° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 3.96 g/cm$^3$ and a thickness of 70 μm in each surface.

Except for using the positive electrode explained here, the same procedure as Example 1 was carried out to prepare a nonaqueous electrolyte secondary battery.

Example 8

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 90° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil.

Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.02 g/cm$^3$ and a thickness of 69 μm in each surface.

Except for using the positive electrode explained here, the same procedure as Example 1 was carried out to prepare a nonaqueous electrolyte secondary battery.

Example 9

There was provided the positive electrode composition containing paste prepared in the same manner as Example 1, which was then applied on one surface of an aluminum foil (i.e., positive electrode current collector) having a thickness of 12 μm. A dry furnace having two dryers was used, one dryer at the upstream side being set at 90° C., and the other dryer at the downstream side being set at 125° C. Thereby a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.11 g/cm$^3$ and a thickness of 67 μm in each surface.

Except for using the positive electrode explained here, the same procedure as Example 1 was carried out to prepare a nonaqueous electrolyte secondary battery.

Example 10

<Preparation of Separator>

Into 5 kg of a plate-shaped boehmite (having an average particle diameter of 1 μm and an aspect ratio of 10), 5 kg of ion exchanged water and 0.5 kg of dispersant (i.e., aqueous type ammonium polycarboxylate having a solid content concentration of 40 mass %) were added. Then, a milling process was carried out in a ball mill having an internal volume of 20 L at a rotation rate of 40 times/min for 10 hours, thereby obtaining a dispersion liquid. A part of the dispersion liquid obtained applied after the process above was dried in vacuum at 120° C. An observation by SEM confirmed that the shape of the boehmite was approximately plate-shaped. Also, the average particle diameter of the boehmite applied after the process was 1 μm.

Into 500 g of the dispersion liquid above, 0.5 g of xanthan gum as a thickening agent, and 17 g of a resin binder dispersion as a binder (i.e., denatured polybutyl acrylate having a solid content of 45 mass %) were added, which were then stirred with a three-one motor for three hours to obtain a homogeneous slurry for preparing a heat-resistant porous layer (II) (which had a solid content ratio of 50 mass %).

Onto one surface of a PE fine porous separator for nonaqueous electrolyte secondary batteries, that is, a resineous porous layer (I), (which had a thickness of 10 μm, a cavity rate of 40% and an average pore diameter of 0.08 μm, in which the melting temperature of PE is 135° C.), a corona discharge process (at an electric discharge amount of 40 W·min/m$^2$) was applied. Onto the processed surface above, the slurry for preparing the heat-resistant porous layer (II) was applied by means of a micro gravure coater, and dried, so as to form a heat-resistant porous layer (II) having a thickness of 2 μm. As a result, a laminate type separator was obtained.

Then, an acrylic acid (which included a solid content ratio of 20 mass %), that is, a delayed tack type adhesive resin as an adhesive resin (C), was provided. The acrylic acid was applied on both surfaces of the stacked product, that is, at the side of the resin porous layer (I) and at the side of heat-resistant porous layer (II) by means of a micro gravure coater, and dried. As a result, there was obtained a separator (a thickness of 22 μm) with the adhesive resin (C) on the both surfaces. In addition, regarding this separator, the total area of the existence domains of the adhesive resin (C) was determined, finding 30% of the area of the surface where the adhesive resin (C) of the separator exists. The targeted application weight of the adhesive resin (C) was 0.5 g/m$^2$.

<Assembling of Battery>

The separator as obtained above was stacked between the positive electrode prepared in accordance with Example 1 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Example 11

The separator prepared in the same manner as Example 10 was provided, which was stacked between the positive electrode prepared in accordance with Example 2 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Example 12

The separator prepared in the same manner as Example 10 was provided, which was stacked between the positive electrode prepared in accordance with Example 3 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Comparative Example 1

There was provided the positive electrode composition containing paste prepared in the same manner as Example 1, which was then applied on one surface of an aluminum foil (i.e., positive electrode current collector) having a thickness of 12 µm. A dry furnace having two dryers was used, one dryer at the upstream side being set at 120° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil of the positive electrode, thereby obtaining a positive electrode having a belt-shape with a length of 1,000 mm and a width of 54 mm. The positive electrode composition layer of the positive electrode obtained above had a density of 3.96 g/cm$^3$ and a thickness of 70 µm in each surface.

Except for using the positive electrode explained here, the same procedure as Example 1 was carried out to prepare a nonaqueous electrolyte secondary battery.

Comparative Example 2

There was provided the positive electrode composition containing paste prepared in the same manner as Example 1, which was then applied on one surface of an aluminum foil (i.e., positive electrode current collector) having a thickness of 12 µm. A dry furnace having two dryers was used, one dryer at the upstream side being set at 125° C., and the other dryer at the downstream side being set at 125° C. Thereby a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 3.95 g/cm$^3$ and a thickness of 70 µm in each surface.

Except for using the positive electrode explained here, the same procedure as Example 1 was carried out to prepare a nonaqueous electrolyte secondary battery.

Comparative Example 3

There was provided the positive electrode composition containing paste prepared in the same manner as Example 1, which was then applied on one surface of an aluminum foil (i.e., positive electrode current collector) having a thickness of 12 µm. A dry furnace having two dryers was used, one dryer at the upstream side being set at 125° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.02 g/cm$^3$ and a thickness of 69 µm in each surface.

Except for using the positive electrode explained here, the same procedure as Example 1 was carried out to prepare a nonaqueous electrolyte secondary battery.

Comparative Example 4

There was provided the positive electrode composition containing paste prepared in the same manner as Example 1, which was then applied on one surface of an aluminum foil (i.e., positive electrode current collector) having a thickness of 12 µm. A dry furnace having two dryers was used, one dryer at the upstream side being set at 125° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 4.11 g/cm$^3$ and a thickness of 67 µm in each surface.

Except for using the positive electrode explained here, the same procedure as Example 1 was carried out to prepare a nonaqueous electrolyte secondary battery.

Comparative Example 5

The separator prepared in the same manner as Example 10 was provided, which was stacked between the positive electrode prepared in accordance with Comparative Example 2 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Comparative Example 6

The separator prepared in the same manner as Example 10 was provided, which was stacked between the positive electrode prepared in accordance with Comparative Example 3 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Comparative Example 7

The separator prepared in the same manner as Example 10 was provided, which was stacked between the positive electrode prepared in accordance with Comparative Example 4 and the negative electrode prepared in accordance with Example 1, and then wound in eddy form to obtain a winding electrode body. Then, the winding electrode body was pressed to make its cross-section flat-shaped, followed by applying a heat press process at 80° C. for one minute at a pressure of 0.5 Pa to obtain a flat-shaped winding electrode body.

Except for using the flat-shaped winding electrode body explained here, the same procedure as Example 1 was carried out to prepare a nonaqueous electrolyte secondary battery.

Example 13

There was provided the positive electrode composition containing paste prepared in the same manner as Example 1, which was then applied on one surface of an aluminum foil (i.e., positive electrode current collector) having a thickness of 12 μm at an application quantity of 25.0 mg/cm². A dry furnace having two dryers was used, one dryer at the upstream side being set at 115° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,100 mm and a width of 54 mm. The positive electrode composition layer of the positive electrode obtained above had a density of 3.96 g/cm³ and a thickness of 63 μm in each surface.

There was provided the negative electrode composition containing paste prepared in the same manner as Example 1, which was then applied on both surfaces of a copper foil (i.e., a negative electrode current collector) having a thickness of 8 μm, and then, dried at 120° C. for 12 hours in vacuum to obtain a negative electrode composition layer having formed on both surfaces of the copper foil (note that it has formed partly on one surface thereof). Then, a calendar process was applied so that the thickness and the density of the negative electrode composition layer were controlled. Then, a negative electrode current collector tab made of nickel was welded on the exposed part of the copper foil, thereby obtaining a negative electrode having a belt-shape with a length of 1,090 mm and a width of 55 mm. The negative electrode composition layer of the negative electrode obtained above had a density of 1.65 g/cm³ and a thickness of 81 μm in each surface.

Except for using the positive electrode and the negative electrode explained here, the same procedure as Example 1 was carried out to prepare a nonaqueous electrolyte secondary battery.

Example 14

There was provided the positive electrode composition containing paste prepared in the same manner as Example 1, which was then applied on one surface of an aluminum foil (i.e., positive electrode current collector) having a thickness of 12 μm at an application quantity of 22.9 mg/cm². A dry furnace having two dryers was used, one dryer at the upstream side being set at 115° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,200 mm and a width of 54 mm. The positive electrode composition layer of the positive electrode obtained above had a density of 3.95 g/cm³ and a thickness of 58 μm in each surface.

There was provided the negative electrode composition containing paste prepared in the same manner as Example 1, which was then applied on both surfaces of a copper foil (i.e., a negative electrode current collector) having a thickness of 8 μm, and then, dried at 120° C. for 12 hours in vacuum to obtain a negative electrode composition layer having formed on both surfaces of the copper foil (note that it has formed partly on one surface thereof). Then, a calendar process was applied so that the thickness and the density of the negative electrode composition layer were controlled. Then, a negative electrode current collector tab made of nickel was welded on the exposed part of the copper foil, thereby obtaining a negative electrode having a belt-shape with a length of 1,190 mm and a width of 55 mm. The negative electrode composition layer of the negative electrode obtained above had a density of 1.65 g/cm³ and a thickness of 74 μm in each surface.

Except for using the positive electrode and the negative electrode explained here, the same procedure as Example 1 was carried out to prepare a nonaqueous electrolyte secondary battery.

Comparative Example 8

There was provided the positive electrode composition containing paste prepared in the same manner as Example 1, which was then applied on one surface of an aluminum foil (i.e., positive electrode current collector) having a thickness of 12 μm at an application quantity of 25.0 mg/cm². A dry furnace having two dryers was used, one dryer at the upstream side being set at 125° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,100 mm and a width of 54 mm. The positive electrode composition layer of the positive electrode obtained above had a density of 3.96 g/cm$^3$ and a thickness of 63 μm in each surface.

There was provided the negative electrode composition containing paste prepared in the same manner as Example 1, which was then applied on both surfaces of a copper foil (i.e., a negative electrode current collector) having a thickness of 8 μm, and then, dried at 120° C. for 12 hours in vacuum to obtain a negative electrode composition layer having formed on both surfaces of the copper foil (note that it has formed partly on one surface thereof). Then, a calendar process was applied so that the thickness and the density of the negative electrode composition layer were controlled. Then, a negative electrode current collector tab made of nickel was welded on the exposed part of the copper foil, thereby obtaining a negative electrode having a belt-shape with a length of 1,090 mm and a width of 55 mm. The negative electrode composition layer of the negative electrode obtained above had a density of 1.65 g/cm$^3$ and a thickness of 81 μm in each surface.

Except for using the positive electrode and the negative electrode explained here, the same procedure as Example 1 was carried out to prepare a nonaqueous electrolyte secondary battery.

Comparative Example 9

There was provided the positive electrode composition containing paste prepared in the same manner as Example 1, which was then was applied on one surface of an aluminum foil (i.e., positive electrode current collector) having a thickness of 12 μm at an application quantity of 27.7 mg/cm$^2$. A dry furnace having two dryers was used, one dryer at the upstream side being set at 125° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,000 mm and a width of 54 mm. The positive electrode composition layer of the positive electrode obtained above had a density of 3.8 g/cm$^3$ and a thickness of 73 μm in each surface.

Except for using the positive electrode explained here, the same procedure as Example 1 was carried out to prepare a nonaqueous electrolyte secondary battery.

Reference Example 1

There was provided the positive electrode composition containing paste prepared in the same manner as Example 1, which was then applied on one surface of an aluminum foil (i.e., positive electrode current collector) having a thickness of 12 μm at an application quantity of 21.2 mg/cm$^2$. A dry furnace having two dryers was used, one dryer at the upstream side being set at 125° C., and the other dryer at the downstream side being set at 115° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,300 mm and a width of 54 mm. The positive electrode composition layer of the positive electrode obtained above had a density of 3.8 g/cm$^3$ and a thickness of 56 μm in each surface.

There was provided the negative electrode composition containing paste prepared in the same manner as Example 1, which was then applied on both surfaces of a copper foil (i.e., a negative electrode current collector) having a thickness of 8 μm, and then, dried at 120° C. for 12 hours in vacuum to obtain a negative electrode composition layer having formed on both surfaces of the copper foil (note that it has formed partly on one surface thereof). Then, a calendar process was applied so that the thickness and the density of the negative electrode composition layer were controlled. Then, a negative electrode current collector tab made of nickel was welded on the exposed part of the copper foil, thereby obtaining a negative electrode having a belt-shape with a length of 1,290 mm and a width of 55 mm. The negative electrode composition layer of the negative electrode obtained above had a density of 1.65 g/cm$^3$ and a thickness of 68 μm in each surface.

Except for using the positive electrode and the negative electrode explained here, the same procedure as Example 1 was carried out to prepare a nonaqueous electrolyte secondary battery.

Reference Example 2

There was provided the positive electrode composition containing paste prepared in the same manner as Example 1, which was then applied on one surface of an aluminum foil (i.e., positive electrode current collector) having a thickness of 12 μm at an application quantity of 21.2 mg/cm$^2$. A dry furnace having two dryers was used, one dryer at the upstream side being set at 125° C., and the other dryer at the downstream side being set at 125° C. Thereby, a positive electrode composition layer was obtained by drying. The other surface of the aluminum foil was treated in the same manner, thereby forming positive electrode composition layers on both surfaces of the aluminum foil. Then, a calendar process was applied in which by adjusting the condition, the thickness and the density of the positive electrode composition layer were controlled. Then, a positive electrode current collector tab made of aluminum was welded on the exposed part of the aluminum foil, thereby obtaining a positive electrode having a belt-shape with a length of 1,300 mm and a width of 54 mm. The positive electrode composition layer of the positive electrode obtained above had a density of 3.8 g/cm$^3$ and a thickness of 56 μm in each surface.

Then, the positive electrode explained above and the negative electrode prepared in the same procedure as Reference Example 2 were used. Unless noted here, the same procedure as Example 1 was carried out to prepare a nonaqueous electrolyte secondary battery.

It is noted that Comparative Example 9 showed that when the current density of the battery was high, the folding strength of the positive electrode could become deteriorated even if the density of the positive electrode composition layer was low. In addition, Reference Examples 1 and 2 showed that when the current density of the battery was low, the folding strength of the positive electrode could become high regardless of the ratio a/b.

Various tests as showed below were carried out for evaluation with respect to the nonaqueous electrolyte secondary batteries of the Examples, the Comparative Examples and the Reference Examples, as well as the positive electrodes of them.

<Folding Strength of Positive Electrode>

Each nonaqueous electrolyte secondary batteries of the Examples, the Comparative Examples and the Reference Examples were disassembled to collect the positive electrodes. The part where the positive electrode composition layer was formed on both surfaces of the current collector was identified, and a test sample was cut out there to have a size of 5 cm in the length direction and 4 cm in the width direction. The test sample was folded at a point of 15 mm from the edge of the length direction in the same winding direction as preparing the winding electrode body. Then, a load of 200 gf was uniformly applied at the folding point of the test sample. Then, the test sample was stretched to open, and the both ends of the test sample was held by a jig of a tensile strength test equipment ("SDT-52" made by Imada SS Corporation). A tension test was carried out at a cross head speed 50 mm/m, and the strength (N) when when the folding point of the test sample was broken was measured. The strength (N) was divided by 4 (cm) to calculate a folding strength (N/cm). As the folding strength becomes high, the breakage of the positive electrode current collector of the flat-shaped winding electrode body of the nonaqueous electrolyte secondary batteries can be more favorably controlled, and therefore, a better evaluation regarding the productivity and the reliability of the nonaqueous electrolyte secondary batteries can be given. The test results are shown in Table 1 and Table 3.

<Evaluation of Ratio a/b>

Each of the nonaqueous electrolyte secondary batteries of the Examples, the Comparative Examples and the Reference Examples was disassembled. With respect to the positive electrode of the winding electrode body, a cross-section at the center of the longitudinal direction of the positive electrode composition layer at the internal side was decided as a target for analysis. The cross-section of the positive electrode was subject to an ion milling processing to expose the surface. The sample of the positive electrode thereby provided was observed by means of SEM ("S-3400N" made by Hitachi, Ltd.), and the elements were detected by EDX (Edax Japan Inc.) to carry out element mapping derived from the binder.

The observation conditions of the SEM were as follows: the acceleration voltage was 15 kV, the magnification was 1,000 times, the pixel was 512×400, and the stay time per unit area was 200 μsec. C (carbon) and F (fluorine) were selected, to observe them at total three points of the positive electrode: two end points of the strip shaped positive electrode, and one point at the center thereof. A ratio a/b was obtained at each point, and averaged value was calculated. These evaluation results are shown in Tables 1 to 3.

<Occurrence of Breakage>

There were provided five samples of nonaqueous electrolyte secondary batteries each prepared in accordance with Examples 1 to 3, 10 to 12 and Comparative Example 2 to 4 and 5 to 7. From these batteries, a flat-shaped winding electrode body was collected and disassembled. At the folded portion of the most internal wounded part of the positive electrode, a sample was cut out to have a size of 5 cm in the longitudinal direction and 4 cm in the width direction of the electrode. Then, the positive electrode as cut out above was again folded at the bent part, thereby making it folded into a half. A load of 10N was uniformly applied for 3 seconds on the plane of such a folded state. Then, the folded positive electrode was opened, and the folded portion was observed. Here, the convex portion along the folding line was observed to find whether the positive electrode was cut.

In the bending test, two samples were prepared from the positive electrode of each battery. In other words, 10 samples were tested in each Example (or Comparative Example). Among the 10 samples, the numbers of the samples in which the positive electrode was cut were counted and shown in Table 2.

<Density of Post-10 Cycle Positive Electrode Composition Layer>

Each nonaqueous electrolyte secondary battery of the Examples, the Comparative Examples and the Reference Examples was charged at a constant current of 1.0 C at room temperature to reach 4.40V. After reached 4.40V, it was then charged at a constant voltage at 4.40V to reach an electric current of 0.05 C. Then, each battery was discharged at a constant current of 1.0 C to reach a voltage of 3.0V. The series of the charge discharge operation above is assumed as one cycle, which was repeated 10 cycles. It is noted that a current value of 1.0 C means a current value which is able to discharge at a rating capacity in one hour.

Then, each battery was disassembled to collect the positive electrode, which was then washed with DEC and dried. The positive electrode after drying was cut out with a predetermined area, and its weight was measured by using an electronic balance having a minimum scale of 1 mg. This weight was subtracted by the weight of the current collector, thereby producing the weight of the post-10 cycle positive electrode composition layer. Also, the total thickness of the post-10 cycle positive electrode was measured at 10 points by using a micrometer having a smallest scale of 1 μm. The thickness of the current collector was subtracted from each total thickness as measured above, and their results were averaged. By using this average value and the area, the volume of the post-10 cycle positive electrode composition layer was calculated. A density of the post-10 cycle positive electrode composition layer was obtained by dividing the weight of the positive electrode composition layer by the volume. The results are shown in Tables 1 to 3.

<Energy Density of Positive Electrode Composition Layer>

In the same condition as measuring the density of the post-10 cycle positive electrode composition layer, there were provided nonaqueous electrolyte secondary batteries of the Examples, the Comparative Examples and the Reference Examples, each of which was disassembled to collect the positive electrode. The positive electrode was cut out to have a size of 2 cm$^2$ in which the positive electrode composition layer was formed on one surface. A thickness was measured by using a micrometer to calculate the volume of the positive electrode composition layer alone as excluding the positive electrode current collector. Using lithium as an opposite electrode, a model cell was prepared by using the nonaqueous electrolyte liquid same as used in the battery of Example 1. Each model cell was applied to a constant voltage charge at 0.05 C to 4.50V, and after reaching 4.50V, it was applied to a constant voltage charge at 4.50V to reach an electric current of 0.005 C. Then, each model cell was discharged at a constant current of 0.05 C to reach 2.5V, and the discharge capacity at that time was obtained. The discharge electric power (i.e., discharge capacity times operating voltage) was calculated. Then, the discharge electric power obtained was divided by the volume of the positive electrode composition layer alone, so as to obtain an energy density (Wh/cm) of the positive electrode composition layer. The energy density of the positive electrode composition layer obtained was shown in Table 1 to Table 3.

<Current Density>

The positive electrode of each nonaqueous electrolyte secondary battery of the Examples, the Comparative Examples and the Reference Examples was collected. The total area of the positive electrode was measured by using a ruler. Then, the current value (mA) of the 1.0 C of each battery was divided by the total area ($cm^2$) of the positive electrode, to obtain a current density ($mA/cm^2$). The current density obtained is shown in Table 1 to Table 3.

TABLE 1

|  | Density of the positive electrode composition layer ($g/cm^3$) | Existence of the adhesive layer | a/b | Folding strength of the positive electrode (N/cm) | Density of the post-10 cycle positive electrode composition layer ($g/cm^3$) | Energy density of the positive electrode composition layer ($Wh/cm^3$) | Current density ($mA/cm^2$) |
|---|---|---|---|---|---|---|---|
| Example 1 | 3.96 | None | 2.1 | 14.3 | 3.77 | 2.71 | 4.58 |
| Example 2 | 4.02 | None | 2.2 | 12.9 | 3.83 | 2.76 | 4.58 |
| Example 3 | 4.11 | None | 2.1 | 9.5 | 3.91 | 2.82 | 4.58 |
| Example 4 | 3.96 | None | 5.5 | 14.4 | 3.77 | 2.71 | 4.58 |
| Example 5 | 4.02 | None | 5.1 | 14 | 3.83 | 2.76 | 4.58 |
| Example 6 | 4.11 | None | 5.4 | 10.4 | 3.91 | 2.82 | 4.58 |
| Example 7 | 3.96 | None | 10.5 | 14.2 | 3.77 | 2.71 | 4.58 |
| Example 8 | 4.02 | None | 11 | 13.9 | 3.83 | 2.76 | 4.58 |
| Example 9 | 4.11 | None | 10.2 | 14 | 3.91 | 2.82 | 4.58 |
| Comparative Example 1 | 3.96 | None | 1.6 | 4.6 | 3.77 | 2.71 | 4.58 |
| Comparative Example 2 | 3.95 | None | 1.0 | 2.2 | 3.76 | 2.71 | 4.58 |
| Comparative Example 3 | 4.02 | None | 1.0 | 1.1 | 3.83 | 2.76 | 4.58 |
| Comparative Example 4 | 4.11 | None | 1.0 | 0 | 3.91 | 2.82 | 4.58 |

TABLE 2

|  | Density of the positive electrode composition layer ($g/cm^3$) | Existence of the adhesive layer | a/b | Occurrence Of Breakage (%) | Density of the post-10 cycle positive electrode composition layer ($g/cm^3$) | Energy density of the positive electrode composition layer ($Wh/cm^3$) | Current density ($mA/cm^2$) |
|---|---|---|---|---|---|---|---|
| Example 1 | 3.96 | None | 2.1 | 0 | 3.77 | 2.71 | 4.58 |
| Example 2 | 4.02 | None | 2.2 | 0 | 3.83 | 2.76 | 4.58 |
| Example 3 | 4.11 | None | 2.1 | 0 | 3.91 | 2.82 | 4.58 |
| Comparative Example 2 | 3.95 | None | 1.0 | 1 | 3.76 | 2.71 | 4.58 |
| Comparative Example 3 | 4.02 | None | 1.0 | 5 | 3.83 | 2.76 | 4.58 |
| Comparative Example 4 | 4.11 | None | 1.0 | 10 | 3.91 | 2.82 | 4.58 |
| Example 10 | 3.96 | Yes | 2.1 | 0 | 3.77 | 2.71 | 4.58 |
| Example 11 | 4.02 | Yes | 2.2 | 0 | 3.83 | 2.76 | 4.58 |
| Example 12 | 4.11 | Yes | 2.1 | 0 | 3.91 | 2.82 | 4.58 |
| Comparative Example 5 | 3.96 | Yes | 1.0 | 6 | 3.77 | 2.71 | 4.58 |
| Comparative Example 6 | 4.02 | Yes | 1.0 | 9 | 3.83 | 2.76 | 4.58 |
| Comparative Example 7 | 4.11 | Yes | 1.0 | 10 | 3.91 | 2.82 | 4.58 |

TABLE 3

|  | Density of the positive electrode composition layer (g/cm³) | Existence of the adhesive layer | a/b | Folding strength of the positive electrode (N/cm) | Density of the post-10 cycle positive electrode composition layer (g/cm³) | Energy density of the positive electrode composition layer (Wh/cm³) | Current density (mA/cm²) |
|---|---|---|---|---|---|---|---|
| Example 1 | 3.96 | None | 2.1 | 14.3 | 3.77 | 2.71 | 4.58 |
| Example 13 | 3.96 | None | 2.1 | 16.4 | 3.77 | 2.71 | 4.24 |
| Example 14 | 3.96 | None | 2.1 | 16.9 | 3.77 | 2.71 | 3.89 |
| Comparative Example 8 | 3.96 | None | 1 | 5.5 | 3.77 | 2.71 | 4.24 |
| Comparative Example 9 | 3.80 | None | 1 | 4.1 | 3.62 | 2.61 | 4.58 |
| Reference Example 1 | 3.80 | None | 2.1 | 17.8 | 3.62 | 2.61 | 3.6 |
| Reference Example 2 | 3.80 | None | 1 | 15.7 | 3.62 | 2.61 | 3.6 |

There are other embodiments than the description above without departing the gist of the present invention. The embodiment described above is an example, and the present invention is not limited to the embodiment. The scope of the present invention should be construed primarily based on the claims, not to the description of the specification or the present application. Any changes within the ranges of the claims and the equivalence thereof should be construed as falling within the scope of the claims.

EXPLANATION OF THE REFERENCES IN THE DRAWINGS

1: Positive electrode;
2: Negative electrode; and
3: Separator.

What is claimed is:

1. A positive electrode for a nonaqueous electrolyte secondary battery, a folded portion formed at least at one part of the positive electrode in an electrode body,
the positive electrode comprising a single first positive electrode composition layer on one side of a positive electrode current collector,
wherein the single first positive electrode composition layer comprises at least a positive electrode active material, a binder and a conductive assistant,
wherein an energy density of the positive electrode composition layer after 10 cycles of charge and discharge is 2.7 Wh/cm³ or more,
wherein a cross-section of the single first positive electrode composition layer has a domain A extending from a central part to a surface side in a thickness direction thereof, and a domain B extending from the central part to the positive electrode current collector thereof, wherein the central part is located with equal distance in the thickness direction from the surface side and the positive electrode current collector,
wherein the single first positive electrode composition layer has an a/b value of 2 or more, the a/b value being obtained in accordance with a method comprising:
a step of detecting elements derived from the binder by means of SEM-EDX with respect to the cross-section of the single first positive electrode composition layer;
a step of selecting a first element included in the binder at the highest quantity among the elements detected, and selecting a second element included in the binder at the second highest quantity among the elements detected;
a step of drawing a first element mapping of the first element, and drawing a second element mapping of the second element, the first element mapping being drawn in a vision field same as the second element mapping; and
a step of calculating an area where the first element mapping overlaps with the second element mapping;
wherein the method is carried out on each the domain A and the domain B, a ratio of the area in the domain A is defined as "a," a ratio of the area in the domain B is defined as "b," thereby obtaining the a/b value.

2. A positive electrode for a nonaqueous electrolyte secondary battery, a folded portion formed at least at one part of the positive electrode in an electrode body,
the positive electrode comprising a single first positive electrode composition layer on one side of a positive electrode current collector,
wherein the single first positive electrode composition layer comprises at least a positive electrode active material, a binder and a conductive assistant,
wherein a density of the positive electrode composition layer after 10 cycles of charge and discharge is 3.7 g/cm³ or more,
wherein a cross-section of the single first positive electrode composition layer has a domain A extending from a central part to a surface side in a thickness direction thereof, and a domain B extending from the central part to the positive electrode current collector thereof, wherein the central part is located with equal distance in the thickness direction from the surface side and the positive electrode current collector,
wherein the single first positive electrode composition layer has an a/b value of 2 or more, the a/b value being obtained in accordance with a method comprising:
a step of detecting elements derived from the binder by means of SEM-EDX with respect to the cross-section of the single first positive electrode composition layer;
a step of selecting a first element included in the binder at the highest quantity among the elements detected, and selecting a second element included in the binder at the second highest quantity among the elements detected;

a step of drawing a first element mapping of the first element, and drawing a second element mapping of the second element, the first element mapping being drawn in a vision field same as the second element mapping; and a step of calculating an area where the first element mapping overlaps with the second element mapping;

wherein the method is carried out on each the domain A and the domain B, a ratio of the area in the domain A is defined as "a," a ratio of the area in the domain B is defined as "b," thereby obtaining the a/b value.

3. The positive electrode for the nonaqueous electrolyte secondary battery according to claim 2, wherein the density of the positive electrode composition layer after 10 cycles of charge and discharge is 3.77 g/cm$^3$ or more.

4. The positive electrode for the nonaqueous electrolyte secondary battery according to claim 2, wherein the density of the positive electrode composition layer after 10 cycles of charge and discharge is 3.83 g/cm$^3$ or more.

5. The positive electrode for the nonaqueous electrolyte secondary battery according to claim 2, wherein the density of the positive electrode composition layer after 10 cycles of charge and discharge is 3.91 g/cm$^3$ or more.

6. A nonaqueous electrolyte secondary battery comprising:

an electrode body comprising a positive electrode, a negative electrode, a separator; and a nonaqueous electrolyte, wherein an energy density of the positive electrode composition layer after 10 cycles of charge and discharge is 2.7 Wh/cm$^3$ or more, wherein the positive electrode comprises: a single first positive electrode composition layer on one side of a positive electrode current collector; and a folded portion formed at least at one part of the positive electrode, wherein the single first positive electrode composition layer comprises at least a positive electrode active material, a binder and a conductive assistant, wherein a cross-section of the single first positive electrode composition layer has a domain A extending from a central part to a surface side in a thickness direction thereof, and a domain B extending from the central part to the positive electrode current collector thereof, wherein the central part is located with equal distance in the thickness direction from the surface side and the positive electrode current collector, wherein the single first positive electrode composition layer has an a/b value of 2 or more, the a/b value being obtained in accordance with a method comprising:

a step of detecting elements derived from the binder by means of SEM-EDX with respect to the cross-section of the single first positive electrode composition layer;

a step of selecting a first element included in the binder at the highest quantity among the elements detected, and selecting a second element included in the binder at the second highest quantity among the elements detected;

a step of drawing a first element mapping of the first element, and drawing a second element mapping of the second element, the first element mapping being drawn in a vision field same as the second element mapping; and a step of calculating an area where the first element mapping overlaps with the second element mapping;

wherein the method is carried out on each the domain A and the domain B, a ratio of the area in the domain A is defined as "a," a ratio of the area in the domain B is defined as "b," thereby obtaining the a/b value.

7. The nonaqueous electrolyte secondary battery according to claim 6, wherein the electrode body is a winding electrode body in which the positive electrode and the negative electrode are wound into in an eddy form with intervention of the separator therebetween, wherein a cross cross-section of the electrode body is flat-shaped.

8. The nonaqueous electrolyte secondary battery according to claim 6, further comprising an adhesive layer at one or both of a first border and a second border, the first border being between the positive electrode and the separator, the second border being between the negative electrode and the separator.

9. The nonaqueous electrolyte secondary battery according to claim 8, wherein the separator is provided with the adhesive layer at one side or both sides thereof.

10. A nonaqueous electrolyte secondary battery comprising:

an electrode body comprising a positive electrode, a negative electrode, a separator; and a nonaqueous electrolyte, wherein a density of the positive electrode composition layer after 10 cycles of charge and discharge is 3.7 g/cm$^3$ or more, wherein the positive electrode comprises: a single first positive electrode composition layer on one side of a positive electrode current collector; and a folded portion formed at least at one part of the positive electrode, wherein the single first positive electrode composition layer comprises at least a positive electrode active material, a binder and a conductive assistant, wherein a cross-section of the single first positive electrode composition layer has a domain A extending from a central part to a surface side in a thickness direction thereof, and a domain B extending from the central part to the positive electrode current collector thereof, wherein the central part is located with equal distance in the thickness direction from the surface side and the positive electrode current collector, wherein the single first positive electrode composition layer has an a/b value of 2 or more, the a/b value being obtained in accordance with a method comprising:

a step of detecting elements derived from the binder by means of SEM-EDX with respect to the cross-section of the single first positive electrode composition layer;

a step of selecting a first element included in the binder at the highest quantity among the elements detected, and selecting a second element included in the binder at the second highest quantity among the elements detected;

a step of drawing a first element mapping of the first element, and drawing a second element mapping of the second element, the first element mapping being drawn in a vision field same as the second element mapping; and a step of calculating an area where the first element mapping overlaps with the second element mapping;

wherein the method is carried out on each the domain A and the domain B, a ratio of the area in the domain A is defined as "a," a ratio of the area in the domain B is defined as "b," thereby obtaining the a/b value.

11. The nonaqueous electrolyte secondary battery according to claim 10, wherein the density of the positive electrode composition layer after 10 cycles of charge and discharge is 3.77 g/cm$^3$ or more.

12. The nonaqueous electrolyte secondary battery according to claim 10, wherein the density of the positive electrode composition layer after 10 cycles of charge and discharge is 3.83 g/cm$^3$ or more.

13. The nonaqueous electrolyte secondary battery according to claim 10, wherein the density of the positive electrode composition layer after 10 cycles of charge and discharge is 3.91 g/cm$^3$ or more.

14. The nonaqueous electrolyte secondary battery according to claim 10, wherein the electrode body is a winding electrode body in which the positive electrode and the negative electrode are wound into in an eddy form with intervention of the separator therebetween, wherein a cross cross-section of the electrode body is flat-shaped.

15. The nonaqueous electrolyte secondary battery according to claim 10, further comprising an adhesive layer at one or both of a first border and a second border, the first border being between the positive electrode and the separator, the second border being between the negative electrode and the separator.

16. The nonaqueous electrolyte secondary battery according to claim 15, wherein the separator is provided with the adhesive layer at one side or both sides thereof.

* * * * *